US012693644B2

(12) United States Patent
Choi et al.

(10) Patent No.: US 12,693,644 B2
(45) Date of Patent: Jul. 28, 2026

(54) ELECTRONIC DEVICE COMPRISING FLEXIBLE DISPLAY, AND OPERATION METHOD THEREFOR

(71) Applicant: SAMSUNG ELECTRONICS CO., LTD., Suwon-si (KR)

(72) Inventors: Yangsoo Choi, Suwon-si (KR); Sukdong Kim, Suwon-si (KR); Jihea Park, Suwon-si (KR); Junghyeob Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 134 days.

(21) Appl. No.: 18/887,349

(22) Filed: Sep. 17, 2024

(65) Prior Publication Data

US 2025/0013214 A1 Jan. 9, 2025

Related U.S. Application Data

(63) Continuation of application No. PCT/KR2023/001212, filed on Jan. 26, 2023.

(30) Foreign Application Priority Data

Mar. 17, 2022 (KR) ........................ 10-2022-0033600
Jul. 13, 2022 (KR) ........................ 10-2022-0086514

(51) Int. Cl.
*H04M 1/72454* (2021.01)
*G05B 15/02* (2006.01)
(Continued)

(52) U.S. Cl.
CPC ........... *G05B 15/02* (2013.01); *G06F 1/1652* (2013.01); *G09G 3/035* (2020.08); *G09G 2340/045* (2013.01)

(58) Field of Classification Search
None
See application file for complete search history.

(56) References Cited

U.S. PATENT DOCUMENTS 9,041,648 B2 * 5/2015 Lee ....................... G06F 1/1647
345/156
10,186,183 B2 * 1/2019 Lee .......................... G09G 3/20
(Continued)

FOREIGN PATENT DOCUMENTS

CN 109357608 A 2/2019
KR 20130055259 A 5/2013
(Continued)

OTHER PUBLICATIONS

International Search Report and Written Opinion for International Application No. PCT/KR2023/001212; International Filing Date Jan. 26, 2023; Date of Mailing Apr. 27, 2023, 69 Pages.

*Primary Examiner* — Martin Mushambo
(74) *Attorney, Agent, or Firm* — CANTOR COLBURN LLP

(57) ABSTRACT

An electronic device having a first housing, a second housing movable with respect to the first housing, a flexible display mounted on the second housing that is configured to be inserted into or ejected from the first housing. The electronic device also includes a motor driving unit for moving the second housing, a memory for storing executable instructions, and at least one processor accessing the memory to execute the instructions. The processor outputs a control signal to the motor driving unit upon receiving a first signal, compares a measurement value related to the movement of the motor driving unit with a preset reference value, determines whether calibration of the motor driving unit is necessary based on the comparison, and provides a user notification if calibration is needed.

18 Claims, 17 Drawing Sheets

(51) Int. Cl.

| | |
|---|---|
| *G06F 1/16* | (2006.01) |
| *G06F 3/0484* | (2022.01) |
| *G09G 3/00* | (2006.01) |
| *G09G 3/3225* | (2016.01) |
| *H04M 1/02* | (2006.01) |
| *H04M 1/725* | (2021.01) |

(56) References Cited

U.S. PATENT DOCUMENTS

| | | | | |
|---|---|---|---|---|
| 11,244,658 | B1* | 2/2022 | Hong | G06F 3/0483 |
| 11,355,091 | B2* | 6/2022 | Lee | G09G 5/38 |
| 11,705,060 | B2* | 7/2023 | Lee | G09G 5/391 |
| | | | | 345/214 |
| 2013/0127917 | A1 | 5/2013 | Kwack et al. | |
| 2014/0028478 | A1* | 1/2014 | Mizoguchi | G01D 5/244 |
| | | | | 341/11 |
| 2015/0153777 | A1 | 6/2015 | Liu et al. | |
| 2015/0370413 | A1 | 12/2015 | Cho et al. | |
| 2016/0306534 | A1 | 10/2016 | Woo et al. | |
| 2016/0307545 | A1* | 10/2016 | Lee | G09G 5/346 |
| 2016/0349971 | A1* | 12/2016 | Chi | G09G 5/373 |
| 2017/0003825 | A1* | 1/2017 | Kwak | G06F 3/0487 |
| 2019/0155476 | A1 | 5/2019 | Kim et al. | |
| 2019/0197960 | A1 | 6/2019 | Kim | |
| 2020/0142662 | A1* | 5/2020 | Ibrahim | G06F 1/1641 |
| 2020/0264660 | A1 | 8/2020 | Song et al. | |
| 2020/0394984 | A1* | 12/2020 | Park | G09G 5/373 |
| 2021/0286380 | A1 | 9/2021 | Zhong et al. | |
| 2022/0180806 | A1* | 6/2022 | Lee | G06F 1/1624 |
| 2022/0229466 | A1* | 7/2022 | Yildiz | G06F 3/04886 |
| 2022/0351656 | A1 | 11/2022 | George Philip et al. | |
| 2023/0093986 | A1 | 3/2023 | Eom et al. | |
| 2023/0186871 | A1* | 6/2023 | Kallio | G06F 1/1681 |
| | | | | 345/1.3 |
| 2023/0195400 | A1 | 6/2023 | Woo et al. | |
| 2023/0221785 | A1 | 7/2023 | Lee et al. | |
| 2023/0336646 | A1 | 10/2023 | Shim et al. | |

FOREIGN PATENT DOCUMENTS

| | | |
|---|---|---|
| KR | 20150144992 A | 12/2015 |
| KR | 20160123201 A | 10/2016 |
| KR | 20190079241 A | 7/2019 |
| KR | 20200075809 A | 6/2020 |
| KR | 20210146095 A | 12/2021 |
| KR | 20220020017 A | 2/2022 |
| KR | 20220058185 A | 5/2022 |
| WO | WO2020166769 A1 | 8/2020 |
| WO | 2021075610 A1 | 4/2021 |
| WO | 2021241964 A1 | 12/2021 |

* cited by examiner

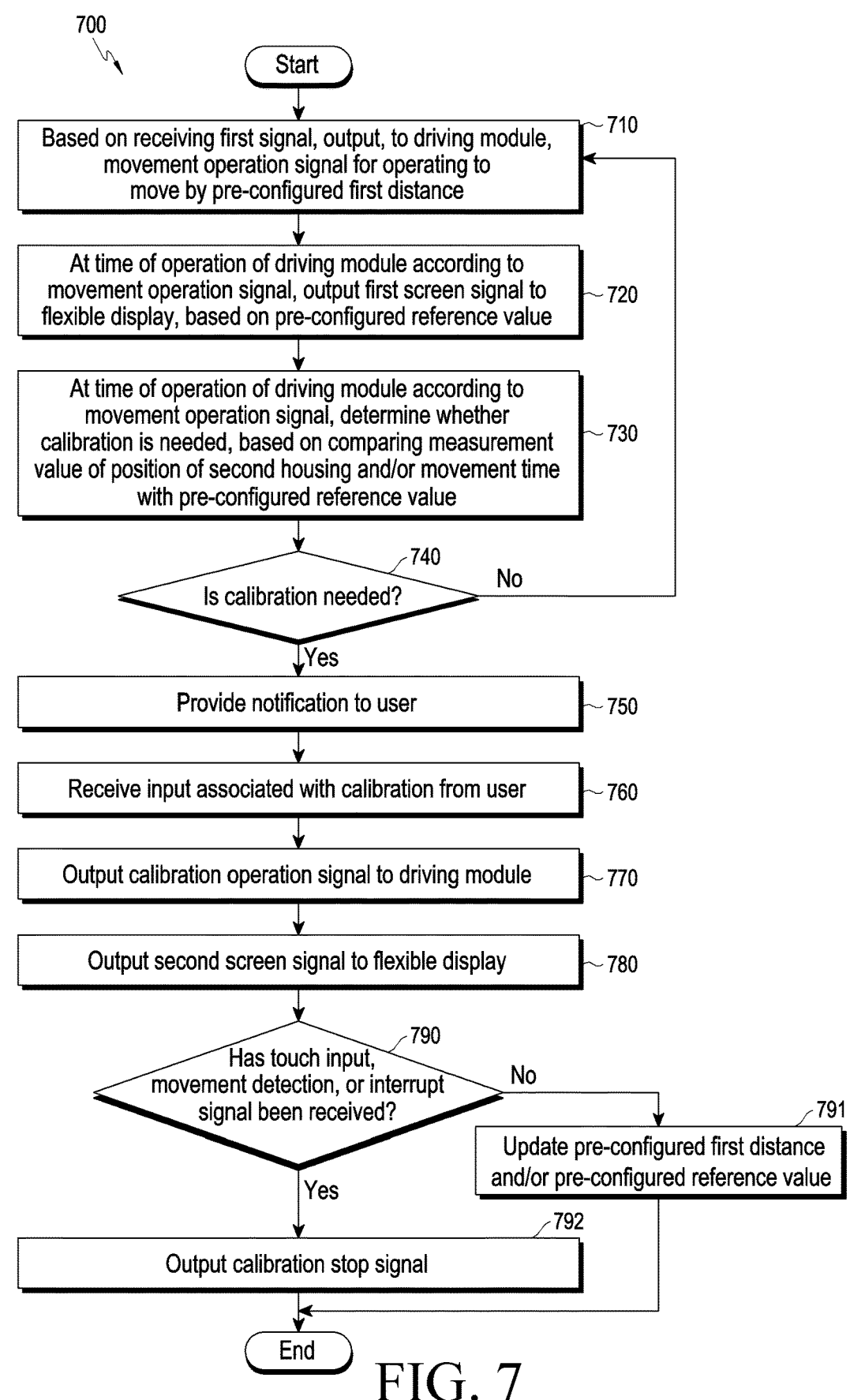

700

Start

Based on receiving first signal, output, to driving module, movement operation signal for operating to move by pre-configured first distance ~710

At time of operation of driving module according to movement operation signal, output first screen signal to flexible display, based on pre-configured reference value ~720

At time of operation of driving module according to movement operation signal, determine whether calibration is needed, based on comparing measurement value of position of second housing and/or movement time with pre-configured reference value ~730

Is calibration needed? 740  No

Yes

Provide notification to user ~750

Receive input associated with calibration from user ~760

Output calibration operation signal to driving module ~770

Output second screen signal to flexible display ~780

Has touch input, movement detection, or interrupt signal been received? 790  No

Update pre-configured first distance and/or pre-configured reference value ~791

Yes

Output calibration stop signal ~792

End

ELECTRONIC DEVICE COMPRISING FLEXIBLE DISPLAY, AND OPERATION METHOD THEREFOR

CROSS-REFERENCE TO RELATED APPLICATIONS

This application is a continuation application, claiming priority under § 365(c), of International Application No. PCT/KR2023/001212 filed on Jan. 26, 2023, which is based on and claims the benefit of Korean patent application number 10-2022-0086514 filed on Jul. 13, 2022, in the Korean Intellectual Property Office and of Korean patent application number 10-2022-0033600 filed on Mar. 17, 2022, in the Korean Intellectual Property Office, the disclosures of which are incorporated by reference herein in their entireties.

BACKGROUND

An embodiment of the disclosure relates to an electronic device and an operation method thereof, the electronic device including a flexible display including a calibration operation of a motor driving unit moving the flexible display.

As the demand for mobile communication increases and as the integration density of electronic devices increases, the portability of electronic devices, such as mobile communication terminals, are improved and convenience in use of multimedia functions may be improved. For example, a display integrated with a touch screen function may substitute for a traditional mechanical (button-type) keypad, whereby minimization of an electronic device is possible with maintaining the functions of an input device. In an example, a mechanical keypad is removed from an electronic device, so that the portability of the electronic device may be improved. In another embodiment, in a case where a display is expanded by an area from which a mechanical keypad is removed, even if an electronic device having a touch screen function has the same size and weight as an electronic device including a mechanical keypad, the electronic device with the touch screen function may provide a screen larger than that of the electronic device including the mechanical keypad.

When a user enjoys web surfing or uses multimedia functions, it may be more convenient to use an electronic device having a larger screen. A larger display may be mounted in an electronic device to output a larger screen. However, in consideration of portability of the electronic device, there may be a limit to expansion of the display size. In an embodiment, a display using organic light-emitting diodes may not only provide a larger screen but also secure portability of the electronic device. For example, a display using organic light-emitting diodes (or an electronic device including same) is able to implement a stable operation even with a considerably thin thickness, and thus may be mounted in the electronic device in a foldable or bendable, or rollable manner.

Thanks to advancements in display technology, various types of electronic products, such as rollable devices using flexible displays, are being developed and distributed. A device that is automatically slid in/out through a motor, among these rollable devices, determines an operation state of the motor through detected size change of the physical display and motor behavior.

SUMMARY

A rollable electronic device including a flexible display is able to expand or reduce the display size, and includes a resizing function of adjusting the size of an application according to the screen size of the display. The rollable electronic device may reduce or expand an area exposed to the outside through an operation of a motor driving unit that moves the display up and down or to the left and right. As the motor driving unit is used, impact, abrasion, or transformation may occur to cause an error in a driving operation.

In order to solve this problem, various embodiments of the disclosure are to detect an error in an operation of a motor driving unit moving a flexible display, and provide a calibration operation corresponding thereto.

According to an embodiment of the disclosure, an electronic device may include a first housing, a second housing disposed to be movable with respect to the first housing, a flexible display configured to be at least partially mounted on the second housing and inserted into the first housing, based on movement of the second housing in a first direction, or ejected from inside the first housing, based on movement of the second housing in a second direction, a motor driving unit configured to move the second housing in the first direction or the second direction, memory storing executable instructions, and at least one processor configured to access the memory to execute the instructions. The instructions, when executed by the at least one processor individually or collectively, cause the electronic device to, based on receiving a first signal, output, to the motor driving unit, a control signal for moving the second housing in the first direction or the second direction by a pre-configured value. The instructions, when executed by the at least one processor individually or collectively, cause the electronic device to, at a time of operation of the motor driving unit according to the control signal, compare a measurement value related to movement by the motor driving unit with a pre-configured reference value. The instructions, when executed by the at least one processor individually or collectively, cause the electronic device to, based on a result of the comparison, determine whether calibration of the motor driving unit is needed. The instructions, when executed by the at least one processor individually or collectively, cause the electronic device to, based on the determination that the calibration is needed, provide a user with a notification related to the calibration being needed.

According to an embodiment of the disclosure, an operation method of an electronic device may include, based on receiving a first signal, outputting, to a motor driving unit, a control signal for moving a second housing, which is disposed to be movable with respect to a first housing, in a first direction or a second direction by a pre-configured value. The operation method of an electronic device may include, at a time of operation of the motor driving unit according to the control signal, comparing a measurement value related to movement by the motor driving unit with a pre-configured reference value. The operation method of an electronic device may include, based on a result of the comparison, determining whether calibration of the motor driving unit is needed. The operation method of an electronic device may include, based on the determination that the calibration is needed, providing a user with a notification related to the calibration being needed.

According to an embodiment of the disclosure, an operation method of an electronic device may include, in case that an input related to execution of calibration is received, outputting, to a motor driving unit, a first movement operation of moving a second housing, which is disposed to be movable with respect to a first housing, up to a first position at which further movement in a first direction is impossible. The operation method of the electronic device may include outputting, to the motor driving unit, a second movement operation of moving the second housing up to a second position at which further movement in a second direction is impossible. The operation method of the electronic device may include updating a pre-configured value related to movement by the motor driving unit, based on a distance by which the motor driving unit has moved the second housing between the first position and the second position or based on a distance between the first position and the second position.

Solutions according to various embodiments are not limited to the above described solutions, and other solutions that have not been mentioned may be clearly understood by those skilled in the art from this specification and the accompanying drawings.

According to various embodiments of the disclosure, whether a motor driving unit is required to be calibrated according to the gap between the physical size of a flexible display and an application screen is identified, and resizing and a movement animation of a screen displayed by the flexible display may be optimized by calibration of the motor driving unit.

In addition, according to various embodiments of the disclosure, a calibration operation of a motor driving unit is performed according to UX provision and reception of a user's input for the calibration operation, whereby the user's inconvenience may be minimized.

BRIEF DESCRIPTION OF DRAWINGS

FIG. 7 illustrates a flowchart relating to a calibration operation of an electronic device according to various embodiments;

DETAILED DESCRIPTION

Figure 1:
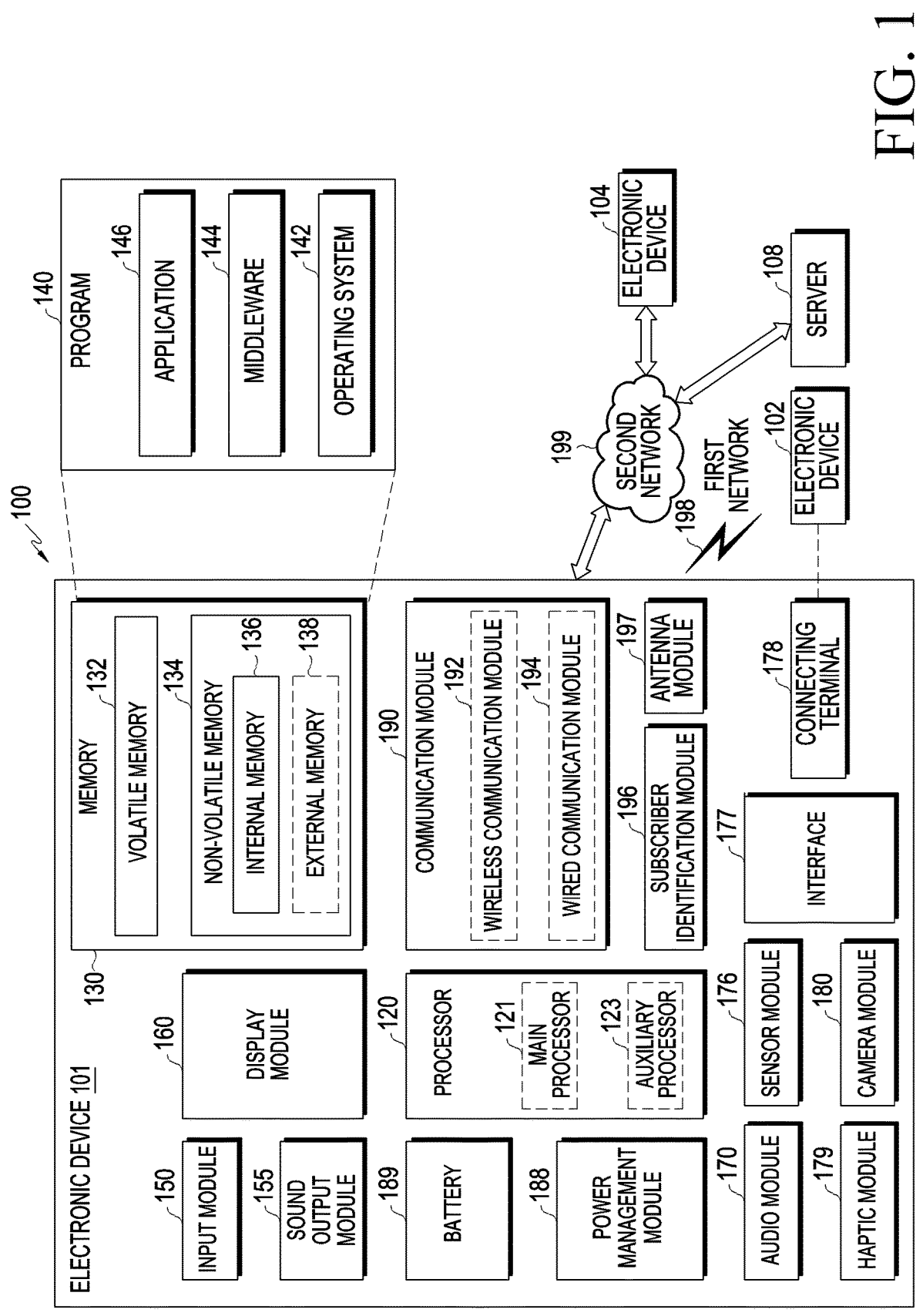
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, various embodiments of an electronic device (e.g., the electronic device 101) disclosed herein are described.

Figure 2A:
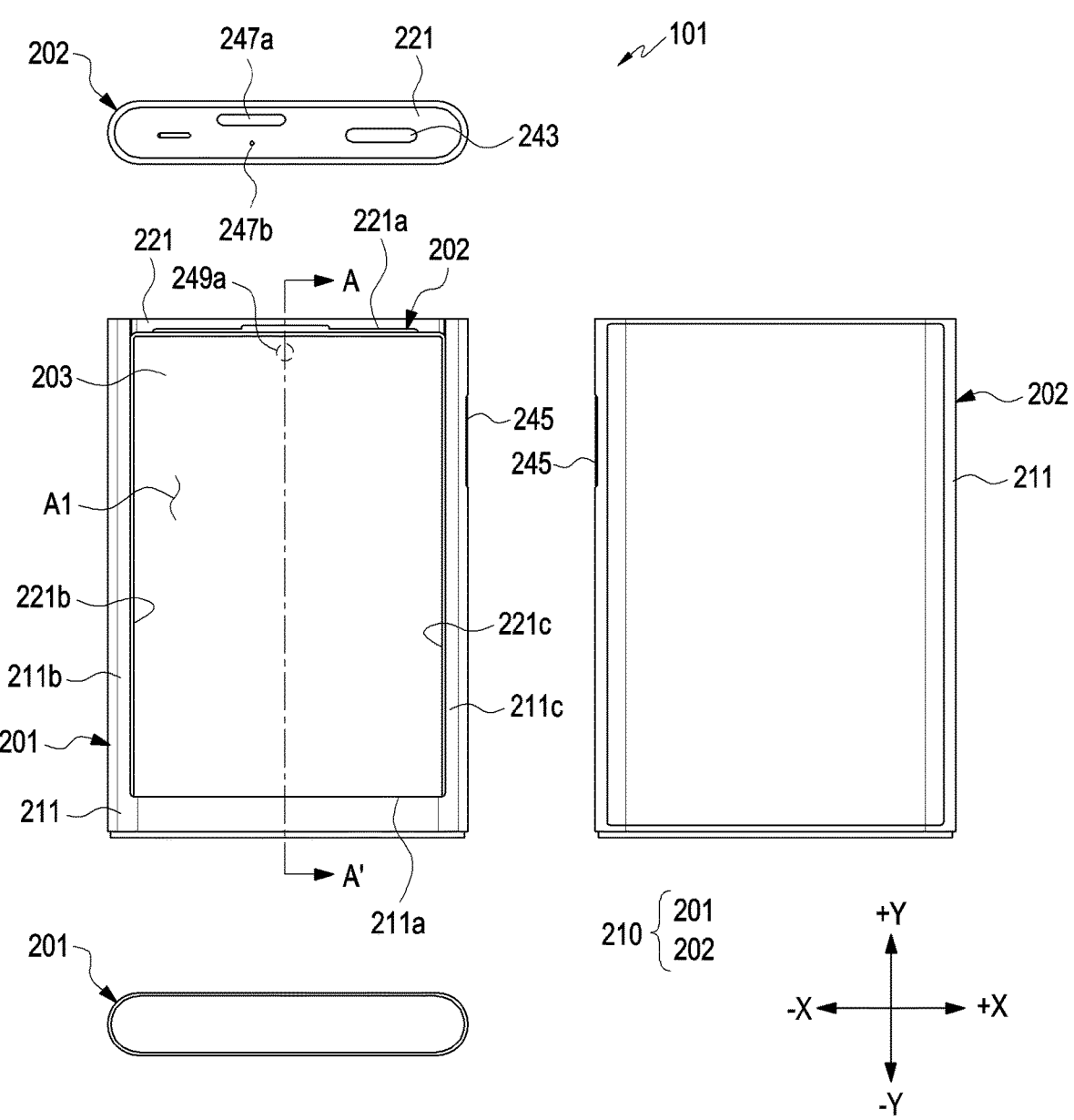
FIG. 2A is a diagram illustrating a state in which a second display area of a display is received in a housing according to various embodiments of the disclosure.
Figure 2B:
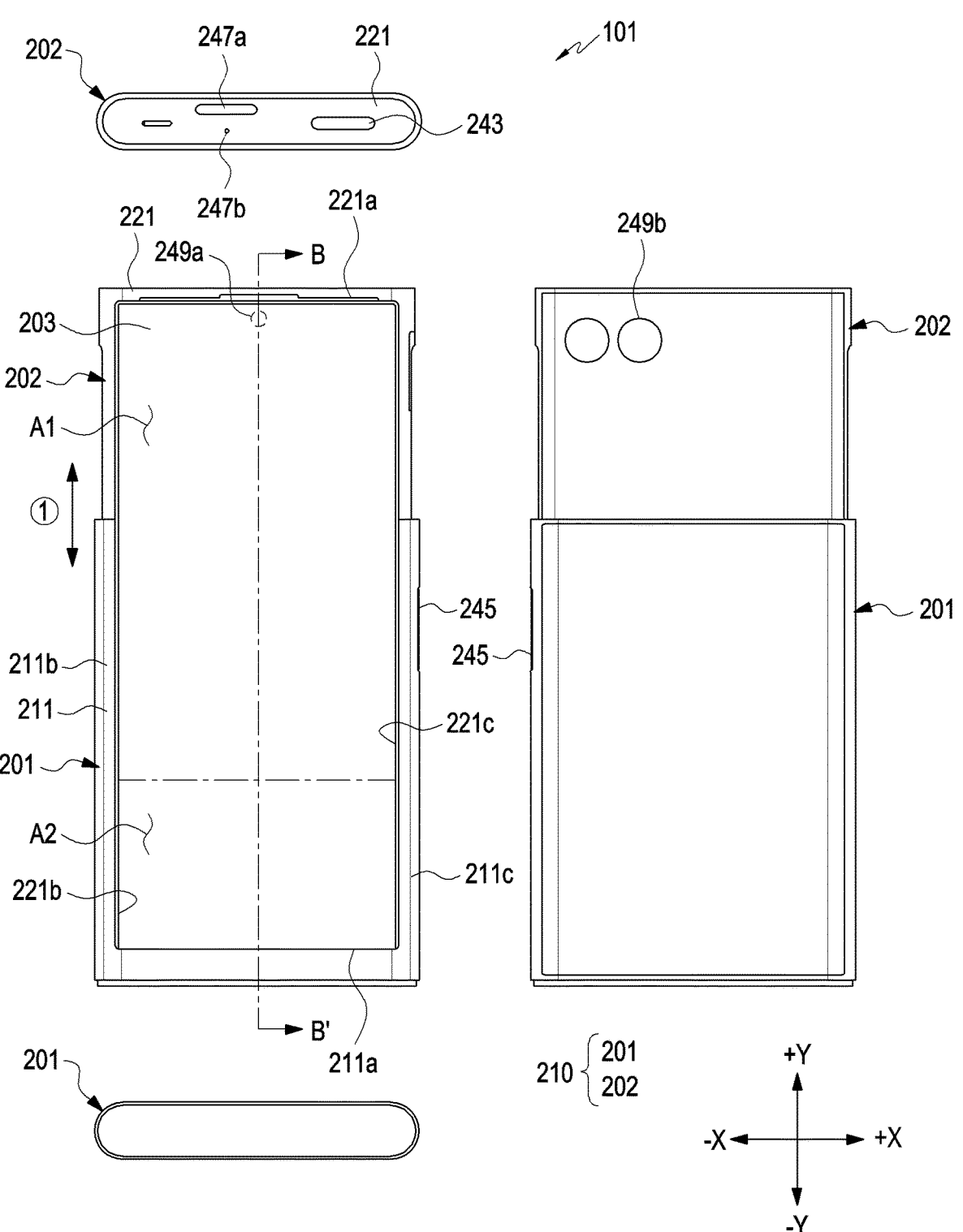
FIG. 2B is a diagram illustrating a state in which a second display area of a display is exposed to the outside of a housing according to various embodiments of the disclosure.

FIG. 2A is a diagram illustrating a state in which a second display area of a display is received in a housing according to various embodiments of the disclosure. FIG. 2B is a diagram illustrating a state in which a second display area of a display is exposed to the outside of a housing according to various embodiments of the disclosure.

FIG. 2A and FIG. 2B illustrate a structure in which a display 203 (e.g., a flexible display or rollable display) is expanded in a lengthwise direction (e.g., +Y direction) when viewed from the front of the electronic device 101. However, the expansion direction of the display 203 is not limited to one direction (e.g., +Y direction). For example, the expansion direction of the display 203 may be designed and changed to enable the display to be expanded in an upward direction (+Y direction), a right direction (e.g., +X direction), a left direction (e.g., −X direction), and/or a downward direction (e.g., −Y direction).

The state illustrated in FIG. 2A may be called a closed state of the electronic device 101 or a housing 210, and a slide-in state of the display 203.

The state illustrated in FIG. 2B may be called an open state of the electronic device 101 or the housing 210, and a slide-out state of the display 203.

Referring to FIG. 2A and FIG. 2B, the electronic device 101 may include the housing 210. The housing 210 may include a first housing 201 and a second housing 202 disposed to be movable relative to the first housing 201. In an embodiment, the housing may be interpreted to have a structure in which the first housing 201 is disposed to be slidable with respect to the second housing 202 in the electronic device 101. According to an embodiment, the second housing 202 may be disposed to be able to reciprocate with respect to the first housing 201 by a predetermined distance in an illustrated direction, for example, a direction indicated by arrow ①.

According to various embodiments, the second housing 202 may be called a slide part or a slide housing, and may be movable relative to the first housing 201. According to an embodiment, the second housing 202 may receive various types of electrical or electronic components, such as a circuit board or a battery.

According to an embodiment, a motor, a speaker, a SIM socket, and/or a sub circuit board electrically connected to a main circuit board may be arranged in the first housing 202. The second housing 202 may receive the main circuit board on which electrical components, such as an application processor (AP) and a communication processor (CP), are mounted.

According to various embodiments, the first housing 201 may include a first cover member 211 (e.g., main case). The first cover member 211 may include a (1-1)th sidewall 211*a*, a (1-2)th sidewall 211*b* extending from the (1-1)th sidewall 211*a*, and a (1-3)th sidewall 211*c* extending from the (1-1)th sidewall 211*a* and substantially parallel to the (1-2)th sidewall 211*b*. According to an embodiment, the (1-2)th sidewall 211*b* and the (1-3)th sidewall 211*c* may be configured to be substantially perpendicular to the (1-1)th sidewall 211*a*.

According to various embodiments, the (1-1)th sidewall 211*a*, the (1-2)th sidewall 211*b*, and the (1-3)th sidewall 211*c* of the first cover member 211 may be configured to have a shape, one side (e.g., a front surface (front face)) is open, so as to receive (or cover) at least a part of the second housing 202. For example, at least a part of the second housing 202 is surround by the first housing 201 and may slide in a direction parallel to a first surface (e.g., a first surface F1 in FIG. 3A), for example, in the arrow ① direction while being guided by the first housing 201. According to an embodiment, the (1-1)th sidewall 211*a*, the (1-2)th sidewall 211*b*, and/or the (1-3)th sidewall 211*c* of the first cover member 211 may be configured to be integrated. According to an embodiment, the (1-1)th sidewall 211*a*, the (1-2)th sidewall 211*b*, and/or the (1-3)th sidewall 211*c* of the first cover member 211 may be configured to be separate structures and then be combined or assembled.

According to various embodiments, the first cover member 211 may be configured to surround at least a part of the display 203. For example, at least a part of the display 203 may be configured to be surrounded by the (1-1)th sidewall 211*a*, the (1-2)th sidewall 211*b*, and/or the (1-3)th sidewall 211*c* of the first cover member 211.

According to various embodiments, the second housing 202 may include a second cover member 221 (e.g., slide plate). The second cover member 221 has a shape of a plate and may include a first surface (e.g., the first surface F1 in FIG. 3A) supporting internal components. For example, the second cover member 221 may support at least a part (e.g., a first display area A1) of the display 203. According to an embodiment, the second cover member 221 may be called a front cover.

According to an embodiment, the second cover member 221 may include a (2-1)th sidewall 221*a*, a (2-2)th sidewall 221*b* extending from the (2-1)th sidewall 221*a*, and a (2-3)th sidewall 221*c* extending from the (2-1)th sidewall 221*a* and substantially parallel to the (2-2)th sidewall 221*b*. According to an embodiment, the (2-2)th sidewall 221*b* and the (2-3)th sidewall 221*c* may be configured to be substantially perpendicular to the (2-1)th sidewall 221*a*.

According to various embodiments, the second housing 202 may configure an open state and a closed state of the housing 210 by moving in the first direction (e.g., direction ①) parallel to the (1-2)th sidewall 211*b* or the (1-3)th sidewall 211*c*. In the closed state, the second housing 202 may be spaced a distance corresponding to a value apart from the (1-1)th sidewall 211*a*, and in the open state, the second housing 202 may move to be spaced a second distance greater than that of the value apart from the (1-1)th sidewall 211*a*. In an embodiment, in the closed state, the first housing 201 may surround a part of the (2-1)th sidewall 221*a*.

According to various embodiments, the electronic device 101 may include the display 203, a key input device 245, a connector hole 243, an audio module, or camera modules 249*a* and 249*b*. According to an embodiment, the electronic device 101 may include an indicator (e.g., LED device) or various sensor modules.

According to various embodiments, the display 203 may include the first display area A1 and a second display area A2 configured to be exposed to the outside of the electronic device 101, based on sliding of the second housing 202. According to an embodiment, the first display area A1 may be disposed on the second housing 202. For example, the first display area A1 may be disposed on the second cover member 221 of the second housing 202. According to an embodiment, the second display area A2 may extend from the first display area A1 and may be received into the first housing 201 (e.g., a slide-in state) or visually exposed to the outside of the electronic device 101 (e.g., a slide-out state) according to the second housing 202 sliding with respect to the first housing 201.

According to various embodiments, the second display area A2 may move by being substantially guided by an area (e.g., a curved surface 213*a* in FIG. 3A) of the first housing 201, and may be received into a space positioned in the first housing 201 or be exposed to the outside of the electronic device 101. According to an embodiment, the second display area A2 may move based on sliding of the second housing 202 in the first direction (e.g., a direction indicated by arrow ①). For example, while the second housing 202 is sliding, a part of the second display area A2 may be transformed to have a shape of a curved surface at a position corresponding to the curved surface 213*a* of the first housing 201.

According to various embodiments, when viewed from above the second cover member 221 (e.g., front cover), if the housing 210 is changed from a closed state to an open state (e.g., if the second housing 202 is slid to be expanded with respect to the first housing 201), the second display area A2 may substantially configure a flat surface together with the first display area A1 while being gradually exposed to the outside of the first housing 201. According to an embodiment, the display 203 may be combined with or disposed to be adjacent to a touch sensing circuit, a pressure sensor capable of measuring the strength (pressure) of a touch, and/or a digitizer that detects a magnetic field-type stylus pen. According to an embodiment, regardless of a closed state or an open state of the housing 210, a part of the exposed second display area A2 may be positioned on a part (e.g., the curved surface 213*a* in FIG. 3A) of the first housing, and the part of the second display area A2 may maintain a shape of a curved surface at a position corresponding to the curved surface 213*a*.

According to various embodiments, the key input device 245 may be positioned on an area of the first housing 201. According to the appearance and use state thereof, the electronic device 101 may be designed to omit the illustrated key input device 245 or include an additional key input device(s). According to an embodiment, the electronic device 101 may include a non-illustrated key input device, for example, a home key button or a touch pad disposed around the home key button. According to an embodiment, at least a part of the key input device 245 may be disposed on the (1-1)th sidewall 211*a*, the (1-2)th sidewall 211*b*, and/or the (1-3)th sidewall 211*c* of the first housing 201.

According to various embodiments, the connector hole 243 may be omitted according to an embodiment, and may receive a connector (e.g., USB connector) for transmitting or receiving power and/or data to or from an external electronic device. According to an embodiment (not illustrated), the electronic device 101 may include multiple connector holes 243, and some of the multiple connector holes 243 may function as a connector hole for transmitting or receiving an audio signal to or from an external electronic device. In an illustrated embodiment, the connector hole 243 is positioned on the second housing 202, but is not limited thereto, and the connector hole 243 or a non-illustrated connector hole may be positioned on the first housing 201.

According to various embodiments, the audio module and may include at least one speaker hole 247a or at least one microphone hole 247b. One of the at least one speaker hole 247a may be provided as a voice call receiver hole, and another one may be provided as an external speaker hole. The electronic device 101 may include a microphone for obtaining sound and the microphone may obtain sound outside the electronic device 101 via the microphone hole 247b. According to an embodiment, the electronic device 101 may include multiple microphones to detect the direction of sound. According to an embodiment, the electronic device 101 may include an audio module including one hole into which the speaker hole 274a and the microphone hole 247b are implemented, or may include a speaker not including the speaker hole 247a (e.g., a piezo speaker).

Figure 3A:
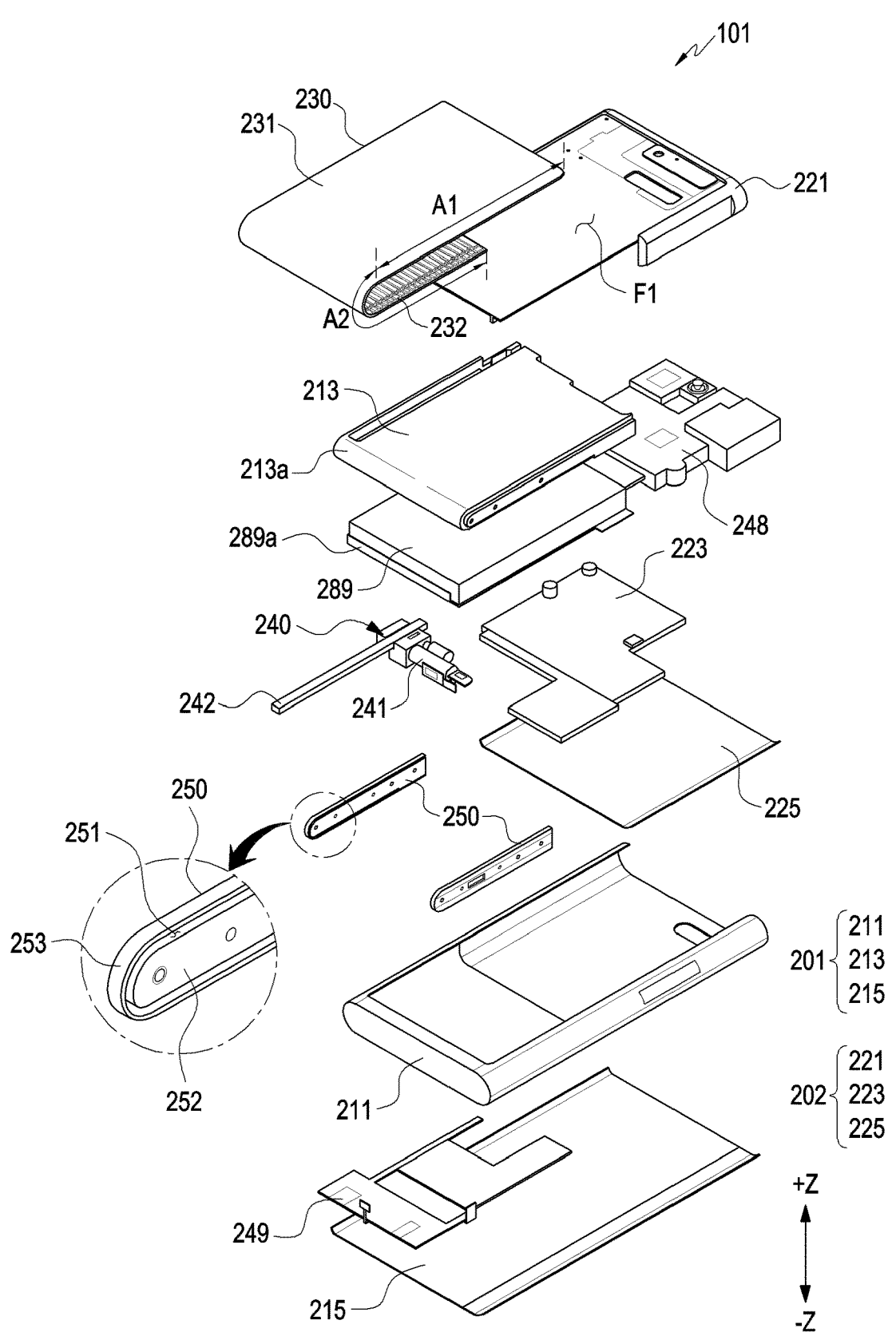
FIG. 3A is an exploded perspective view of an electronic device according to various embodiments of the disclosure.
Figure 3B:
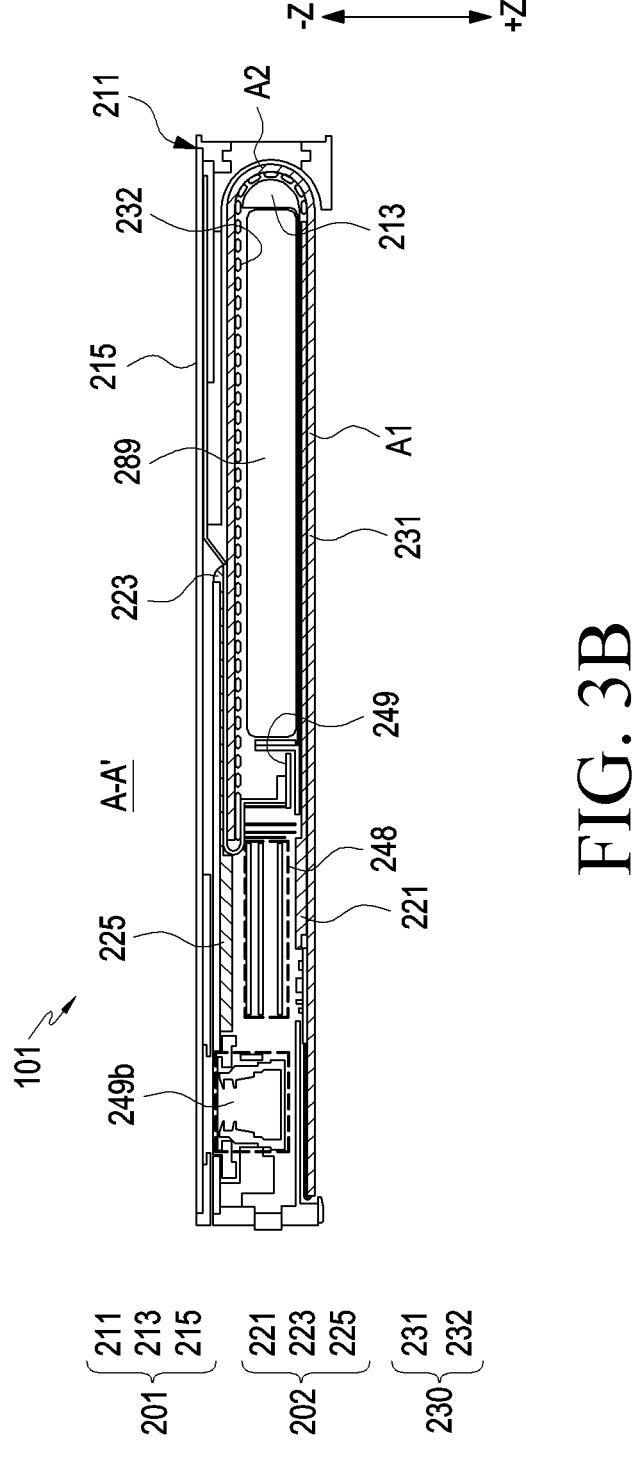
FIG. 3B is a cross section taken along line A-A' illustrated in FIG. 2A according to various embodiments of the disclosure.
Figure 3C:
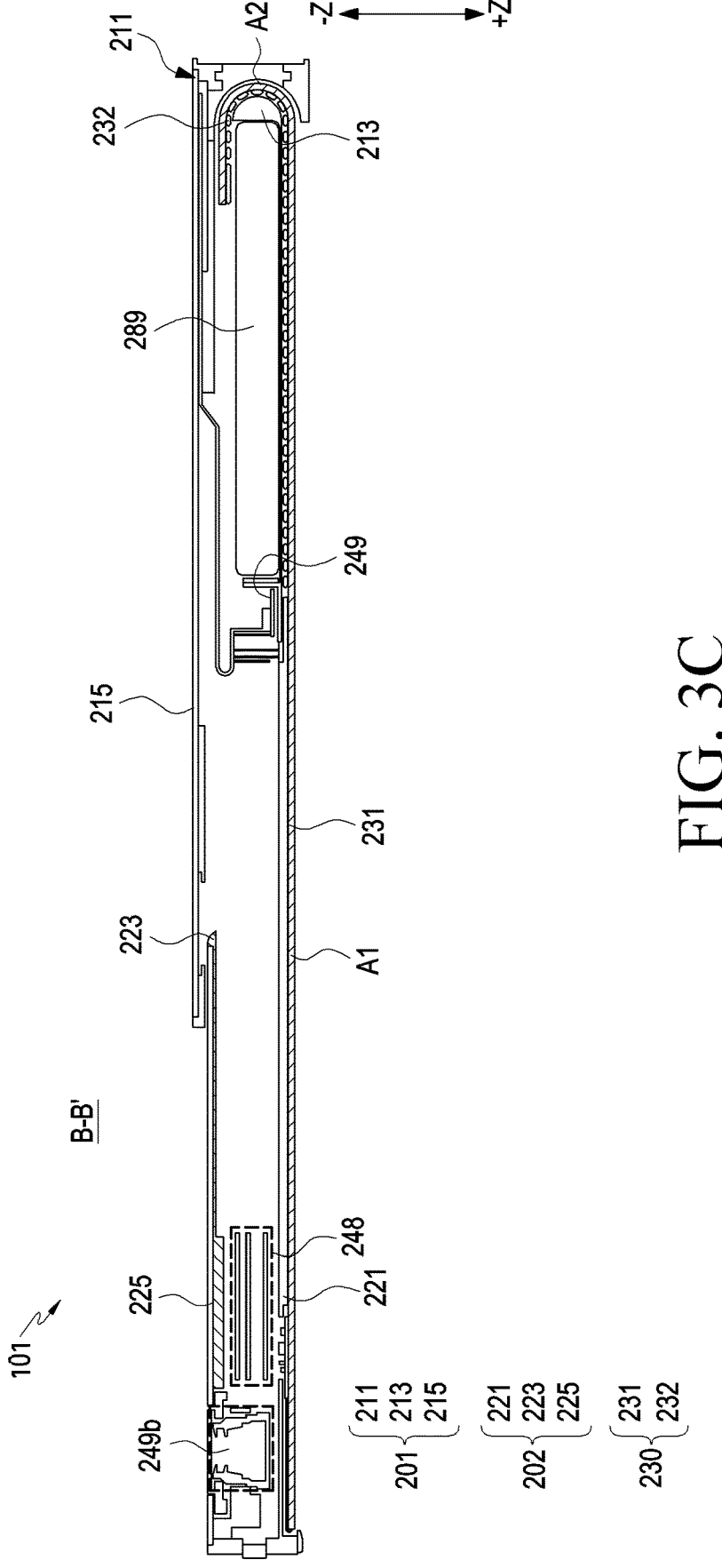
FIG. 3C is a cross section taken along line B-B' illustrated in FIG. 2B according to various embodiments of the disclosure.

According to various embodiments, the camera modules 249a and 249b may include a first camera module 249a (e.g., front camera) and a second camera module 249b (e.g., rear camera) (e.g., the second camera module 249b in FIG. 3B and FIG. 3C). According to an embodiment, the electronic device 101 may include at least one of a wide-angle camera, a telephoto camera, or a close-up camera, and according to an embodiment, may include an infrared projector and/or an infrared receiver to measure the distance from a subject. Each of the camera modules 249a and 249b may include one or multiple lens, an image sensor, and/or an image signal processor. The first camera module 249a may be disposed to face the same direction as the display 203. For example, the first camera module 249a may be disposed around the first display area A1 or in an area overlapping with the display 203, and if the first camera module is disposed in the area overlapping with the display 203, may capture an image of a subject by passing through the display 203. According to an embodiment, the first camera module 249a may not be visually exposed to a screen display area (e.g., the first display area A1), and may include a hidden under-display camera (UDC). According to an embodiment, the second camera module 249b may capture an image of a subject in a direction opposite to the first display area A1. According to an embodiment, the first camera module 249a and/or the second camera module 249b may be disposed on the second housing 202.

According to various embodiments, an indicator (not illustrated) of the electronic device 101 may be disposed on the first housing 201 or the second housing 202, and include a light-emitting diode to provide a visual signal as state information of the electronic device 101. A sensor module (not illustrated) of the electronic device 101 may generate an electrical signal or a data value corresponding to an internal operational state or an external environmental state of the electronic device 101. The sensor module may include, for example, a proximity sensor, a fingerprint sensor, or a biometric sensor (e.g., iris/facial recognition sensor or HRM sensor). In another embodiment, the sensor module may further include, for example, at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

FIG. 3A is an exploded perspective view of an electronic device according to various embodiments of the disclosure.

FIG. 3B is a cross section taken along line A-A' illustrated in FIG. 2A according to various embodiments of the disclosure.

FIG. 3C is a cross section taken along line B-B' illustrated in FIG. 2B according to various embodiments of the disclosure.

Referring to FIG. 3A, FIG. 3B, and/or FIG. 3C, an electronic device 101 may include a first housing 201, a second housing 202, a display assembly 230, and a driving structure 240. A configuration of the first housing 201, the second housing 202, and the display assembly 230 in FIG. 3A, FIG. 3B, and/or FIG. 3C may be the same as the entirety or some of a configuration of the first housing 201, the second housing 202, and the display 203 in FIG. 2A and/or FIG. 2B.

According to various embodiments, the first housing 201 may include a first cover member 211 (e.g., the first cover member 211 in FIG. 2A and FIG. 2B), a frame 213, and a first rear plate 215.

According to various embodiments, the first cover member 211 may receive at least a part of the frame 213 and receive a component (e.g., a battery 289) positioned on the frame 213. According to an embodiment, the first cover member 211 may be configured to surround at least a part of the second housing 202. According to an embodiment, a second circuit board 249 receiving an electronic component (e.g., the processor 120 and/or the memory 130 in FIG. 1) may be connected to the first cover member 211.

According to various embodiments, the frame 213 may be connected to the first cover member 211. For example, the frame 213 may be connected to the first cover member 211 and the second housing 202 may move relative to the first cover member 211 and/or the frame 213. According to an embodiment, the frame 213 may receive the battery 289. According to an embodiment, the frame 213 may include a curved part 213a facing the display assembly 230.

According to various embodiments, the first rear plate 215 may substantially configure at least a part of the appearance of the electronic device 101 or the first housing 201. For example, the first rear plate 215 may be combined with an outer surface of the first cover member 211. According to an embodiment, the first rear plate 215 may provide a decoration effect at the appearance of the electronic device 101. The first rear plate 215 may be manufactured using at least one of metal, glass, synthetic resin, or ceramic.

According to various embodiments, the second housing 202 may include a second cover member 221 (e.g., the second cover member 221 in FIG. 2A and FIG. 2B), a rear cover 223, and a second rear plate 225.

According to an embodiment, the second cover member 221 may be connected to the first housing 201 via guide rails 250 and may linearly reciprocate in one direction (e.g., the arrow ① direction in FIG. 2B) while being guided by the guide rails 250.

According to various embodiments, the second cover member 221 may support at least a part of the display 203. For example, the second cover member 221 includes a first surface F1, and the first display area A1 of the display 203 may be maintained to have a shape of a flat plate by being substantially positioned on the first surface F1. According to an embodiment, the second cover member 221 may be made of a metallic material and/or a non-metallic (e.g., polymer) material. According to an embodiment, a first circuit board 248 receiving an electronic component (e.g., the processor 120 and/or the memory 130 in FIG. 1) may be connected to the second cover member 221.

According to various embodiments, the rear cover 223 may protect a component (e.g., the first circuit board 248) positioned on the second cover member 221. For example, the rear cover 223 is connected to the second cover member 221 and may be configured to surround at least a part of the first circuit board 248. According to an embodiment, the rear cover 223 may include an antenna pattern for communicating with an external electronic device. For example, the rear cover 223 may include a laser direct structuring (LDS) antenna.

According to various embodiments, the second rear plate 225 may substantially configure at least a part of the appearance of the electronic device 101 or the second housing 202. For example, the second rear plate 225 may be combined with an outer surface of the second cover member 221. According to an embodiment, the second rear plate 225 may provide a decoration effect at the appearance of the electronic device 101. The second rear plate 215 may be manufactured using at least one of metal, glass, synthetic resin, or ceramic.

According to various embodiments, the display assembly 230 may include a display 231 (e.g., the display 203 in FIG. 2A and/or FIG. 2B) and a multi-bar structure 232 supporting the display 203. According to an embodiment, the display 231 may be called a flexible display, a foldable display, and/or a rollable display.

According to various embodiments, the multi-bar structure 232 may be connected or attached to at least a part (e.g., a second display area A2) of the display 231. According to an embodiment, according to sliding of the second housing 202, the multi-bar structure 232 may move with respect to the first housing 201. In a closed state (e.g., FIG. 2A) of the electronic device 101, most of the multi-bar structure 232 is received in the first housing 201, and may be positioned between the first cover member 211 and the second cover member 221. According to an embodiment, at least a part of the multi-bar structure 232 may move to correspond to the curved surface 213a positioned at an edge of the frame 213. According to an embodiment, the multi-bar structure 232 may be called a display support member or support structure, and may have a shape of an elastic plate.

According to various embodiments, the driving structure 240 may move the second housing 202 relative to the first housing 201. For example, the driving structure 240 may include a motor 241 configured to generate driving force for sliding the housings 201 and 202. The driving structure 240 may include a gear (e.g., pinion) connected to the motor 241 and a rack 242 configured to be engaged with the gear.

According to various embodiments, a housing in which the rack 242 is positioned and a housing in which the motor 241 is positioned may be different from each other. According to an embodiment, the motor 241 may be connected to the second housing 202 and the rack 242 may be connected to the first housing 201. According to another embodiment, the motor 241 may be connected to the first housing 201 and the rack 242 may be connected to the second housing 202.

According to various embodiments, the first housing 201 may receive the first circuit board 248 (e.g., main board). According to a processor, memory, and/or an interface may be mounted on the first circuit board 248. The processor may include, for example, one or more of a central processing device, an application processor, a graphics processing device, an image signal processor, a sensor hub processor, or a communication processor. According to various embodiments, the first circuit board 248 may include a flexible printed circuit board type radio frequency cable (FRC). The first circuit board 248 may be disposed on at least a part of the second cover member 221, and may be electrically connected to an antenna module and a communication module.

According to an embodiment, the memory may include, for example, volatile memory or nonvolatile memory.

According to an embodiment, the interface may include, for example, a high-definition multimedia interface (HDMI), a universal serial bus (USB) interface, an SD card interface, and/or an audio interface. The interface may, for example, electrically or physically connect the electronic device 101 to an external electronic device, and may include a USB connector, an SD card/MMC connector, or an audio connector.

According to various embodiments, the electronic device 101 may include the second circuit board 249 (e.g., sub circuit board) spaced apart from the first circuit board 248 (e.g., main circuit board) in the first housing 201. The second circuit board 249 may be electrically connected to the first circuit board 248 through a connection flexible substrate. The second circuit board 249 may be electrically connected to the battery 289 or electrical components arranged in an end part area of the electronic device 101, such as a speaker and/or SIM socket, and transfer a signal and power thereto. According to an embodiment, the second circuit board 249 may receive a wireless charging antenna (e.g., coil). For example, the battery 289 may receive power transferred from an external electronic device, by using the wireless charging antenna. As another example, the battery 289 may transfer power to an external electronic device, by using the wireless charging antenna.

According to various embodiments, the battery 289 may include a non-rechargeable primary battery, a rechargeable secondary battery, or a fuel cell as a device for supplying power to at least one element of the electronic device 101. The battery 289 may be integrally disposed in the electronic device 101, and may be detachably attached to the electronic device 101. According to an embodiment, the battery 289 may be configured to be one integrated battery or include multiple separate batteries. According to an embodiment, the battery 289 may be disposed on the frame 213 and the battery 289 may slide together with the frame 213.

According to various embodiments, the guide rails 250 may guide the movement of the multi-bar structure 232. For example, the multi-bar structure 232 may slide along slits 251 configured on the guide rails 250. According to an embodiment, the guide rails 250 may be connected to the first housing 201. For example, the guide rails 250 may be connected to the first cover member 211 and/or the frame 213. According to an embodiment, the slits 251 may be called grooves or recesses configured on inner surfaces of the guide rails 250.

According to various embodiments, the guide rails 250 may provide a pressure to the multi-bar structure 233, based on driving of the motor 241.

According to an embodiment, when the electronic device 101 is changed from a closed state to an open state, inner parts 252 of the guide rails 250 may provide a pressure to the multi-bar structure 232. The multi-bar structure 232 receiving the pressure may move along the slits 251 of the guide rails 250, and the second housing 202 may be changed from a slide-in state to a slide-out state with respect to the first housing 201. At least a part of the display assembly 230 having been received between the first cover member 211 and the frame 213 may be expanded to the front.

According to an embodiment, when the electronic device 101 is changed from an open state to a closed state, outer parts 253 of the guide rails 250 may provide a pressure to the bent multi-bar structure 232. The multi-bar structure 232 receiving the pressure may move along the slits 251 of the guide rails 250, and the second housing 202 may be changed from a slide-out state to a slide-in state with respect to the first housing 201. At least a part of the display assembly 230 may be received between the first cover member 211 and the frame 213.

Referring to FIG. 3B, in the closed state of the electronic device 101, at least a part of the second housing 202 may be disposed to be received in the first housing 201. When the second housing 202 is disposed to be received in the first housing 201, the overall volume of the electronic device 101 may be reduced. According to an embodiment, when the second housing 202 is received in the first housing 201, the size of the visually exposed display 231 may be minimized. For example, when the second housing 202 is completely received in the first housing 201, the first display area A1 of the display 231 may be visually exposed, and the second display area A2 may not be visually exposed. At least a part of the second display area A2 may be disposed between the battery 289 and the rear plates 215 and 225.

Referring to FIG. 3C, in the open state of the electronic device 101, at least a part of the second housing 202 may protrude from the first housing 201. When the second housing 202 protrudes from the first housing 201, the overall volume of the electronic device 101 may increase. For example, when the second housing 202 protrudes from the first housing 201, at least a part of the second display area A2 of the display 231 may be visually exposed to the outside of the electronic device 101 together with the first display area A1.

Figure 4A:
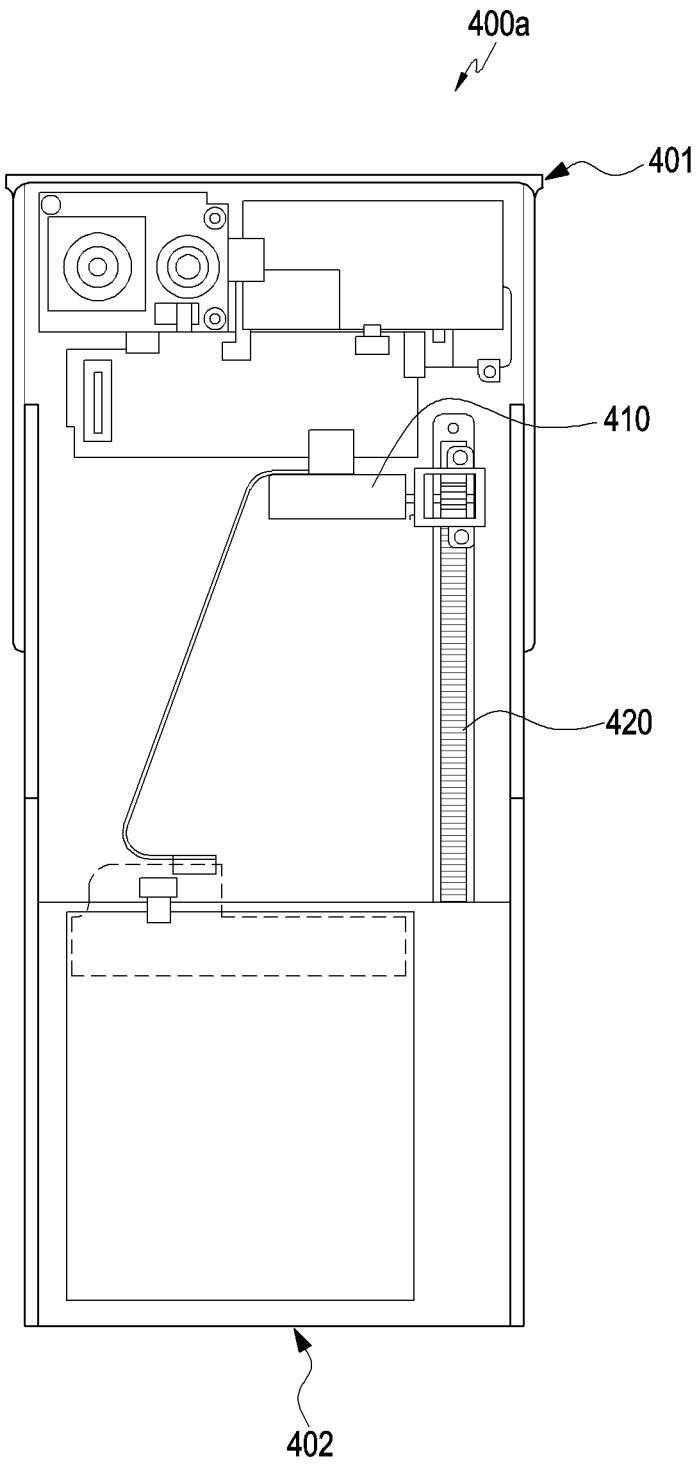
FIG. 4A is a diagram of an example illustrating an electronic device including a structure enabling at least a part of a flexible display to move in the left/right direction according to various embodiments.
Figure 4B:
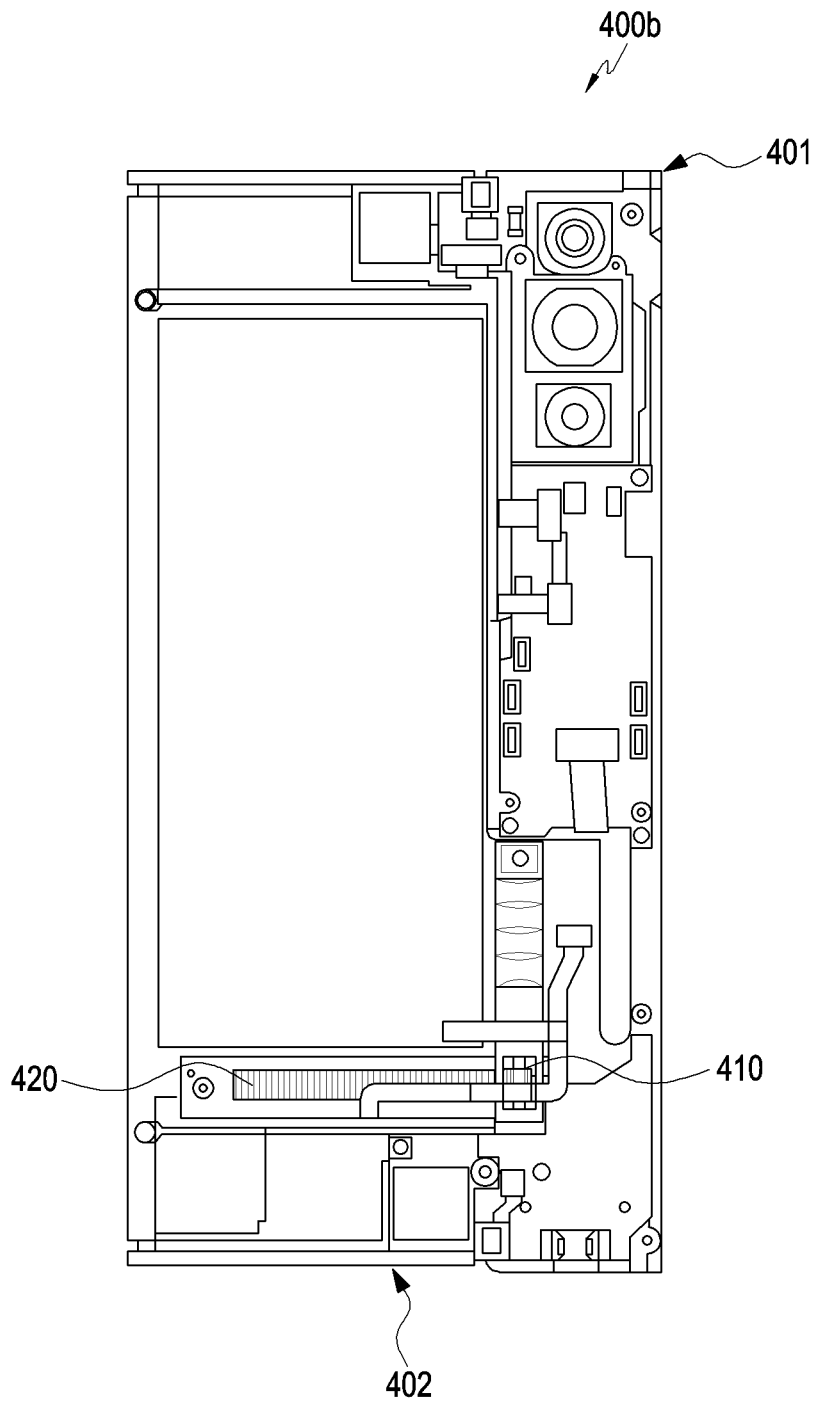
FIG. 4B is a diagram of an example illustrating an electronic device including a structure enabling at least a part of a flexible display to move in the upward/downward direction according to various embodiments.

FIG. 4A is a diagram of an example illustrating an electronic device 400a including a structure enabling at least a part of a flexible display to move in the left/right direction according to various embodiments. FIG. 4B is a diagram of an example illustrating an electronic device 400b including a structure enabling at least a part of a flexible display to move in the upward/downward direction according to various embodiments.

Referring to FIG. 4A or FIG. 4B, a motor driving unit 410 of the electronic device 400a or 400b according to various embodiments is fixed to a first housing 401, and may operate according to an operation signal to move a second housing 402 relative to the first housing 401.

As illustrated in FIG. 4A, the motor driving unit 410 may have a structure moving at least a part of a display in the left/right direction, and as illustrated in FIG. 4B, the motor driving unit 410 may have a structure moving at least a part of the display in the upward/downward direction.

As an embodiment, the motor driving unit 410 may include a driving source (e.g., a driving motor) operated by application of power and a gear (not illustrated) transferring power generated from the driving source to the second housing. The motor driving unit 410 may be applicable to both a form factor capable of transverse expansion/reduction by moving in the transverse direction, and a form factor capable of longitudinal expansion/reduction by moving in the longitudinal direction. For example, as illustrated in FIG. 4A and FIG. 4B, the motor driving unit 410 may move a slide rail 420 to convert a rotational motion into a linear motion (sliding).

Figure 5:
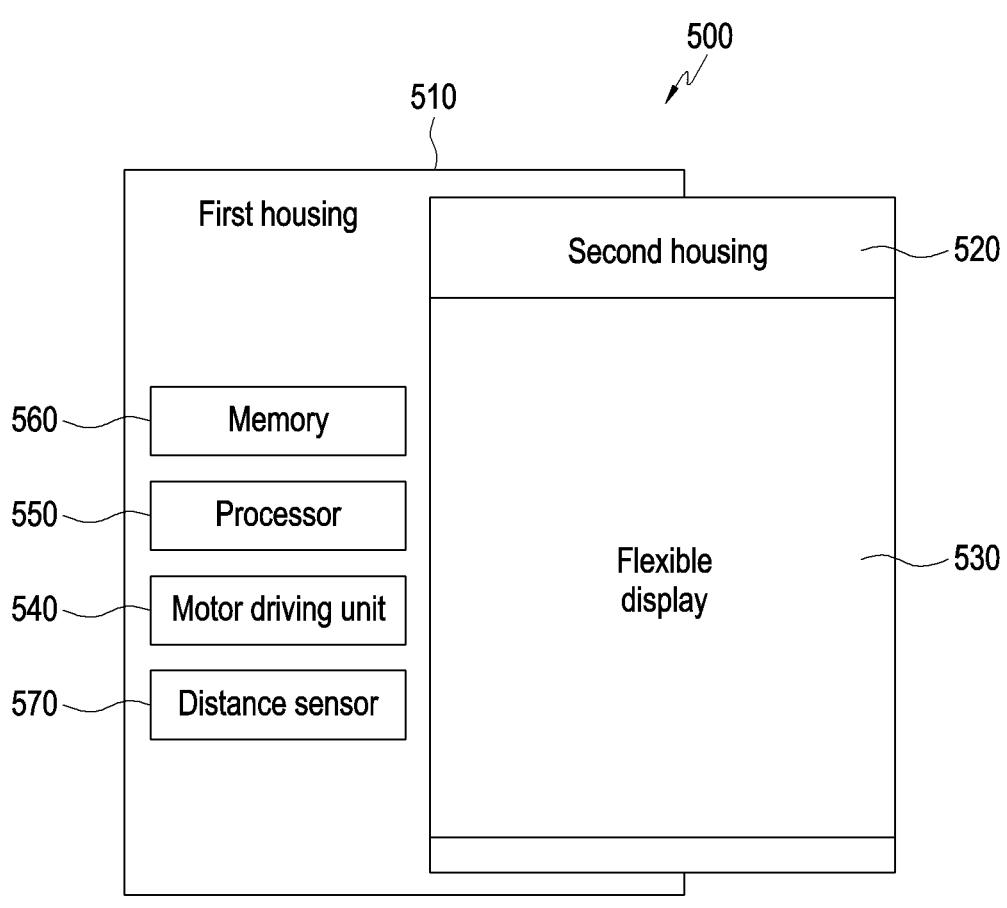
FIG. 5 illustrates a block diagram of an electronic device according to various embodiments.

FIG. 5 illustrates a block diagram of an electronic device 500 according to various embodiments.

Further referring to FIG. 5, the electronic device 500 according to an embodiment may include a first housing 510, a second housing 520 disposed to be movable with respect to the first housing 510 and overlapping with at least a part of the first housing 510, a flexible display 530 which is at least partially mounted on a surface of the second housing 520 and is at least partially exposed outside the electronic device 500, and at least a part of which is inserted into the first housing 510, based on the second housing 520 being moved in a first direction with respect to the first housing 510, or is ejected from inside the first housing 510, based on the second housing 520 being moved in a second direction with respect to the first housing 510, a motor driving unit 540 disposed in the first housing 510 or the second housing 520 and configured to move the second housing 520 in the first direction or the second direction, based on operation of a driving source, at least one processor 550, and/or at least one memory 560 operably connected to the at least one processor 550.

The electronic device 500 according to an embodiment may further include a distance sensor 570 that is fixed to the first housing 510 and is configured to detect a relative position of the second housing 520 or the flexible display 530 to the first housing 510, and may detect, using the distance sensor 570 and as a measurement value related to behavior of the motor driving unit 540, the relative position of the second housing 520 or the flexible display 530 at a time of operation of the motor driving unit 540 according to a control signal.

The at least one processor 550 according to an embodiment may output, to the distance sensor 570, a distance detection signal for detecting the relative position of the second housing 520 or the flexible display 530. More specifically, the at least one processor 550 may output a distance detection signal for detecting the relative position of the second housing 520 or the flexible display 530 by the distance sensor 570 before and/or after the operation of the motor driving unit 540 according to the control signal. The distance sensor 570 may, based on receiving the distance detection signal, detect the relative position of the second housing 520 or the flexible display 530 before and/or after the operation of the motor driving unit 540 according to the control signal, thereby detecting a position (first position) of a reduced state of the flexible display 530 and a position (second position) of an expanded state thereof.

The distance sensor 570 according to an embodiment may detect a distance from a fixed position on the first housing 510 to a particular point of the second housing 520 or the flexible display 530. Therefore, the at least one processor 550 may detect a distance by which the second housing 520 has been moved with respect to the first housing 510 in the first direction and/or the second direction, based on the relative position of the second housing 520 or the flexible display 530 detected by the distance sensor 570 before and/or after the operation of the motor driving unit 540 according to the control signal.

Figure 6:
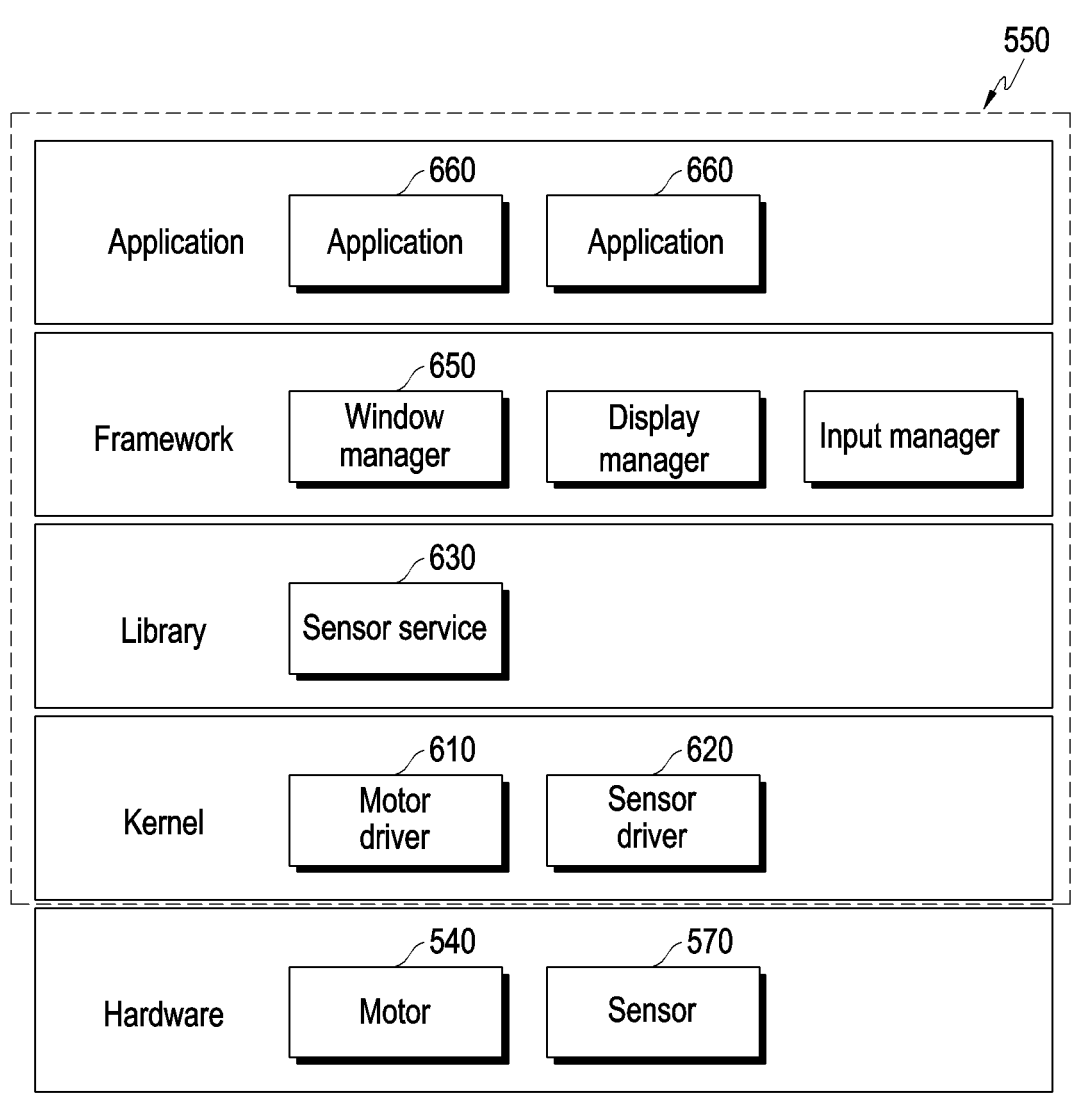
FIG. 6 illustrates a S/W layer diagram of at least one processor according to various embodiments.

FIG. 6 illustrates an S/W layer diagram of the at least one processor 550 according to various embodiments.

Further referring to FIG. 6, the at least one processor 550 according to various embodiments may include an S/W module that controls H/W including the motor driving unit 540 (e.g., a driving motor) and/or the distance sensor 570.

A motor driver 610 according to an embodiment may drive the motor driving unit 540 according to a received command, and transmit a signal related to an event for starting, interrupting, and/or terminating an operation of the motor driving unit 540. In addition, a sensor driver 620 according to an embodiment may receive a sensor enable command to activate the distance sensor 570 and then transmit a detection value read by the distance sensor 570 to a sensor service 630. The sensor service 630 according to an embodiment may transmit a signal received from the sensor driver 620 or the motor driver 610 to a framework.

A window manager 650 according to an embodiment may manage a window of an application 660 and perform resizing control of a UI displayed on a display screen.

FIG. 7 illustrates a flowchart 700 relating to a calibration operation of the electronic device 500 according to various embodiments.

Referring to FIG. 7, an electronic device (e.g., the at least one processor 550) according to various embodiments may, in operation 710, based on receiving a first signal, output, to a motor driving unit, a control signal for moving a second housing in a first direction or a second direction by a pre-configured value. The electronic device 500 according to various embodiments may operate a driving source of the motor driving unit, based on receiving the first signal. Here, the first signal may be a trigger signal that generates expansion and/or reduction of a flexible display.

The electronic device 500 according to various embodiments may, in operation 710, output, to the motor driving unit, a control signal for moving the second housing in the first direction or the second direction by a pre-configured value (e.g., 30 mm). The motor driving unit may receive the control signal and operate to move the second housing in the first direction or the second direction by the pre-configured value. For example, the first direction may be a direction in which at least a part of the flexible display is inserted into the first housing, and the second direction may be a direction in which at least a part of the flexible display is ejected from inside the first housing.

Here, the pre-configured value may be configured in advance to be a distance by which movement by the driving source is required to correspond to a movement distance for reduction and/or expansion of the flexible display, based on an initial state of the motor driving unit. For example, if the driving source is a driving motor, the pre-configured value may be configured in advance to be a rotation count (e.g., 10 rotations) by which the driving motor has to rotate to correspond to a movement distance for reduction and/or expansion of the flexible display. The pre-configured value is configured to correspond to a distance by which the second housing moves between a first position at which the exposed area of the flexible display is minimum and a second position at which the same area is maximum. However, as described below, an error may occur due to a cause, such as abrasion or gear transformation of the driving motor included in the motor driving unit and, accordingly, update of the pre-configuration value may be required.

As an embodiment, the pre-configured value may be configured in advance to be a distance by which the second housing moves between the first position at which the exposed area of the flexible display is minimum and the second position at which the same area is maximum, or may be configured in advance to be each of multiple movement distances by which the second housing moves to multiple designated positions between the first position at which the exposed area of the flexible display is minimum and the second position at which the same area is maximum.

The electronic device 500 according to various embodiments may, in operation 720, at a time of operation of the motor driving unit according to the control signal, based on a pre-configured reference value, output, to the flexible display, a first screen signal for resizing a screen displayed by the flexible display or displaying a pre-configured moving screen, the flexible display having at least a part which is inserted into the first housing, based on the second housing being moved in the first direction with respect to the first housing, or is ejected from inside the first housing, based on the second housing being moved in the second direction with respect to the first housing. The flexible display may, when the first screen signal is received, resize the displayed screen or display the pre-configured moving screen.

As an embodiment, the flexible display may adjust resizing of the screen displayed by the flexible display according to a pre-configured reference value for a movement time taken for the motor driving unit to move the second housing in the first direction or the second direction by the pre-configured value or a relative position of the second housing or the flexible display, at a time of operation of the motor driving unit according to an operation signal. Specifically, the flexible display may, while resizing the displayed screen, turn on or turn off a display screen in an area expanded or reduced according to operation of the motor driving unit or turn on or turn off a touch circuit. Additionally, the flexible display may resize the size of an app displayed on the screen.

Here, the pre-configured reference value may be a reference value for at least one of a movement time taken for the motor driving unit to move the second housing in the first direction or the second direction by the pre-configured value, and/or a relative position of the second housing or the flexible display, at the time of the operation of the motor driving unit according to the control signal.

As an embodiment, the flexible display may display a pre-configured moving screen according to a pre-configured reference value for a movement time taken for the motor driving unit to move the second housing in the first direction or the second direction by the pre-configured value or a relative position of the second housing or the flexible display, at a time of operation of the motor driving unit according to an operation signal.

As an embodiment, the pre-configured moving screen may be an image, such as an animation employing a moving effect, and the reproduction time of the image may be adjusted according to the pre-configured reference value for the movement time. The flexible display according to an embodiment may identify the exposed area of the flexible display according to the pre-configured reference value for the relative position of the second housing or the flexible display, and display the pre-configured moving screen, based on the identified exposed area.

Figure 8:
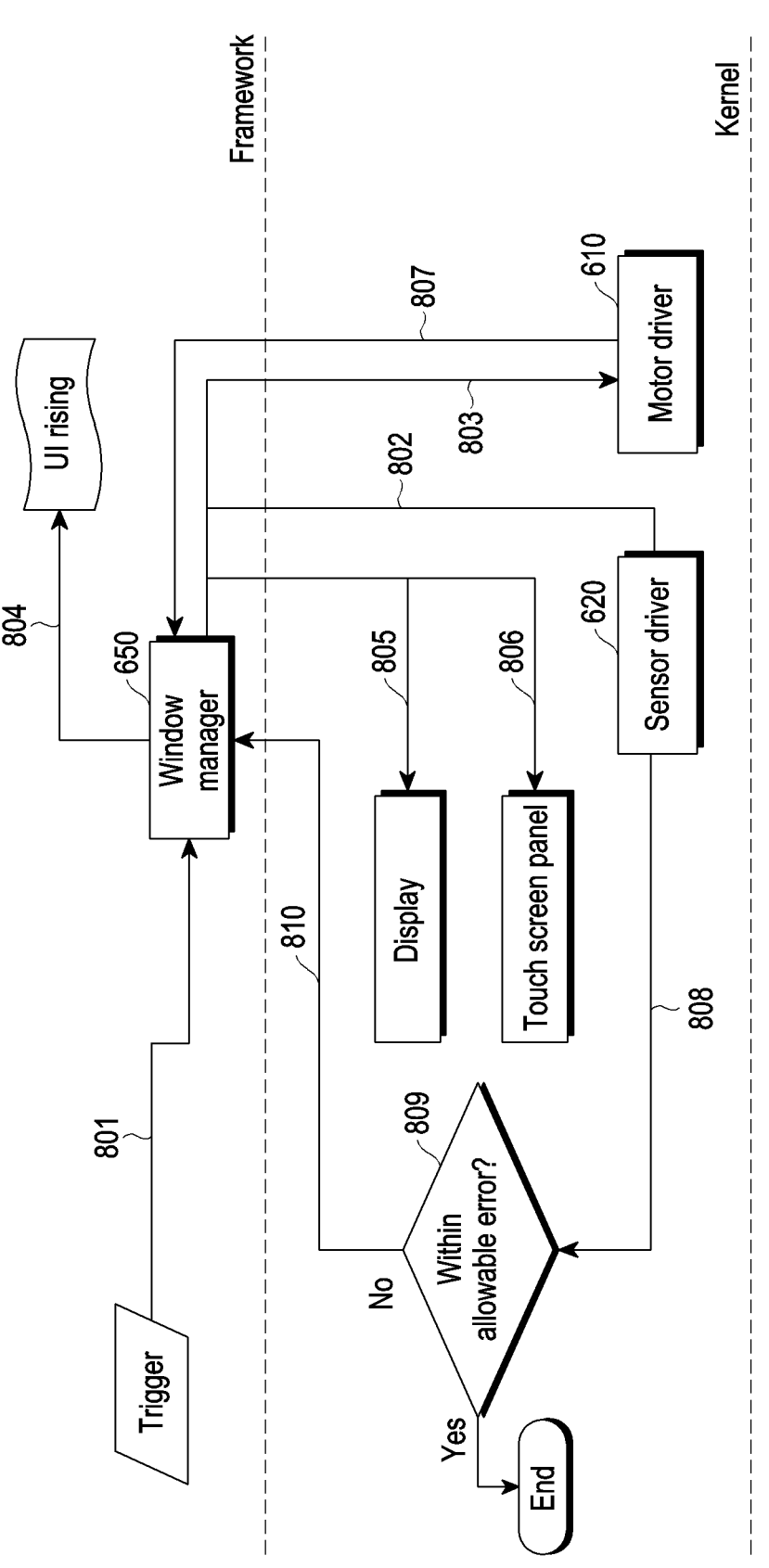
FIG. 8 illustrates a signal flowchart for a resizing operation of a flexible display performed by at least one processor according to various embodiments.

FIG. 8 illustrates a signal flowchart for a resizing operation of a display (e.g., a flexible display) performed by at least one processor (e.g., the window manager 650 shown in FIG. 6) according to various embodiments.

Further referring to FIG. 8, the window manager 650 may receive a first signal according to occurrence of a trigger in operation 801. In addition, the window manager 650 may, in operation 802, identify a movement start position of the display by using a sensor driver 620 before driving of a motor driver 610.

The window manager 650 may, in operation 803, transmit a control signal to the motor driver 610 to allow movement of a predetermined distance by a motor driving unit (e.g., the driving motor 610) and may store a start time at which the driving motor starts to operate. In addition, after or simultaneously with operation 803, the window manager 650 may, in operation 804, execute a resizing operation of adjusting the size of a display screen and/or an application being executed. In the resizing operation according to an embodiment, the size of the display screen and/or the application being executed may be adjusted during an expected driving time of the driving motor. In the resizing operation according to another embodiment, a detection value of the distance sensor may be received and resizing may be performed to correspond to the received detection value.

Additionally, after or simultaneously with operation 803 or 804, in an embodiment, the window manager 650 may turn off the screen of the display by a reduced area in operation 805 or may turn off a touch screen panel (TSP) by a reduced area in operation 806. As another embodiment, the window manager 650 may turn on the screen of the display and the TSP by an increased area in operation 805 and operation 806.

The window manager 650 may, in operation 807, receive a signal associated with a driving completion event of the driving motor from the motor driver 610, simultaneously terminate the operation of the motor driver 610, and store a time at which the driving of the motor driver 610 is completed. The window manager 650 may, in operation 808, identify a movement termination position of the display after the operation of the motor driver 610 is completed, via the sensor driver 620 by using the distance sensor, calculate a moved distance from the movement start position of the display identified in operation 802, and calculate an error from the predetermined distance having been requested for the movement by the driving motor in operation 803. When the error between the actual moved distance of the display and the predetermined distance having been requested for the movement by the driving motor is equal to or smaller than an allowable error, the window manager 650 may terminate the resizing operation of the display, and when the error between the moved distance of the display and the predetermined distance having been requested for the movement by the driving motor exceeds the allowable error, the at least one processor may store the error and update a cumulative count.

Referring to FIG. 7 again, the electronic device 500 according to various embodiments may, in operation 730, at the time of the operation of the motor driving unit according to the control signal, determine whether calibration of the motor driving unit is needed, based on comparing a measurement value related to movement by the motor driving unit with a pre-configured reference value.

As an embodiment, the measurement value related to the movement by the motor driving unit may include a movement time taken for the motor driving unit to move the second housing in the first direction or the second direction by the pre-configured value at the time of the operation of the motor driving unit according to the control signal. The processor may compare the movement time taken for the motor driving unit to move the second housing in the first direction or the second direction by the pre-configured value, with a pre-configured reference value, and when the error from the pre-configured reference value for the movement time is equal to or greater than a pre-configured allowable error (e.g., 100 ms), determine that calibration of the motor driving unit is needed. As an embodiment, when a cumulative count at which the error is equal to or greater than the pre-configured allowable error is equal to or greater than a pre-configured count or when a frequency at which the error is equal to or greater than the pre-configured allowable error is equal to or greater than a pre-configured ratio, the processor may determine that calibration of the motor driving unit is needed.

Additionally, the measurement value related to the movement by the motor driving unit may include a relative position of the second housing or the display at the time of the operation of the motor driving unit according to the control signal. Specifically, the measurement value may include a relative position of the second housing or the display detected before and/or after the operation of the motor driving unit according to the control signal.

The at least one processor according to an embodiment may determine that calibration of the motor driving unit is needed, when the error between a pre-configured reference value and the relative position of the second housing or the display detected before the operation of the motor driving unit according to the control signal and/or the relative position of the second housing or the display detected after the operation of the motor driving unit according to the control signal is equal to or greater than a pre-configured allowable error (e.g., 2 mm).

The at least one processor according to an embodiment may determine that calibration of the motor driving unit is needed, when a cumulative count at which the error is equal to or greater than the pre-configured allowable error is equal to or greater than a pre-configured count or when a frequency at which the error is equal to or greater than the pre-configured allowable error is equal to or greater than a pre-configured ratio, the processor may determine that calibration of the motor driving unit is needed. The processor according to another embodiment may determine that calibration of the motor driving unit is needed, when the error between a pre-configured reference value and the distance between the relative positions of the second housing or the display detected before and after the operation of the motor driving unit according to the control signal is equal to or greater than a pre-configured allowable error (e.g., 2 mm).

Here, pre-configured reference values corresponding to normal operation, based on an initial state of the motor driving unit are shown as in, for example, the table below.

TABLE 1

| Items | Normal operation range |
|---|---|
| Distance value (slide-in) from position (first position) at which display is minimum | 165 mm (within error of 2 mm) |
| Distance value (slide-out) from position (second position) at which display is maximum | 196 mm (within error of 2 mm) |
| Motor driving time (slide-in) | 1500 ms (within error of 100 ms) |
| Motor driving time (slide-out) | 1300 ms (within error of 100 ms) |
| Allowable cumulative count | Less than 5% (less than 5 times out of 100 times) |

Figure 9:
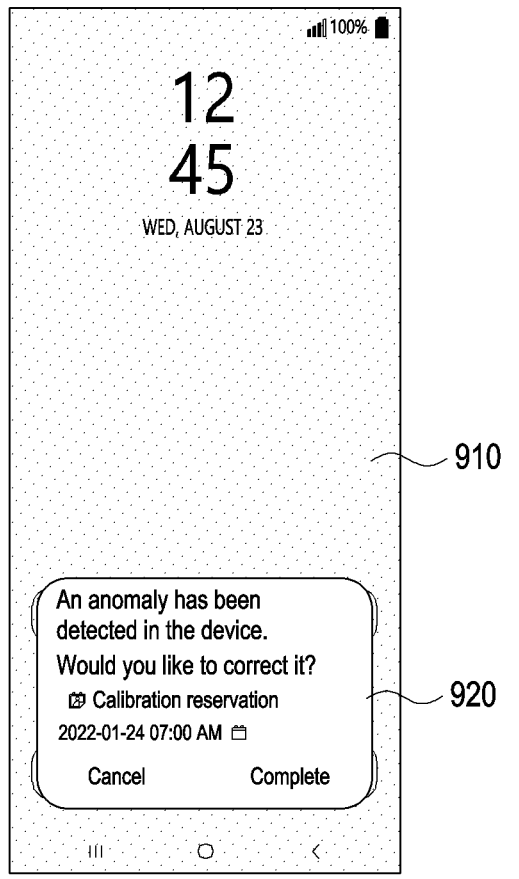
FIG. 9 illustrates a screen of a flexible display associated with a motor driving unit being in need of calibration according to various embodiments.
Figure 10:
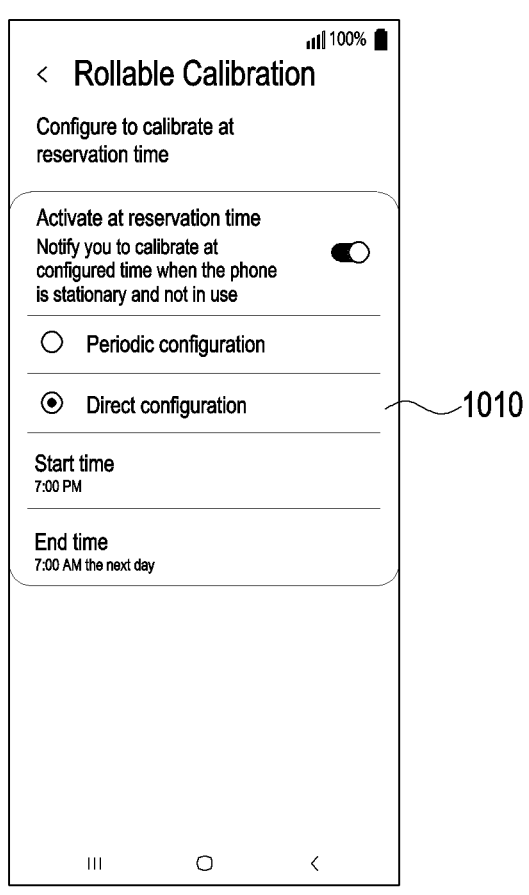
FIG. 10 illustrates a screen of a flexible display associated with a reservation input for performing calibration of a motor driving unit according to various embodiments.

FIG. 9 illustrates a screen of a flexible display 910 associated with a motor driving unit being in need of calibration according to various embodiments. FIG. 10 illustrates a screen of a flexible display 1010 associated with a reservation input for performing calibration of a motor driving unit according to various embodiments. Further referring to FIG. 9, the electronic device 500 according to various embodiments may, when it is determined in operation 740 that calibration is needed, provide a notification 920 enabling a user to recognize same in operation 750. As an embodiment, the rollable-type electronic device 500 may have an allowable error for the position of the display 910 and/or a motor driving time according to an operation of the motor driving unit, due to how the user is holding same or various environmental causes. When an error exceeding this allowable error range occurs, the electronic device may store an error value, and when the frequency of the error value exceeds a predetermined cumulative count, may notify the user to recognize that calibration of the motor driving unit is needed, by using a UX, such as a notification 920 or dialog.

Further referring to FIG. 10, the electronic device 500 according to various embodiments may, in operation 760, receive an input associated with calibration of the motor driving unit from the user in response to the provided notification.

The input associated with the calibration received from the user may be an operation input for immediately performing calibration or a reservation input for performing calibration at a particular condition (e.g., xx(hour):xx(min)). In addition, the electronic device 500 may output a calibration operation signal to the motor driving unit according to the received input associated with the calibration. The motor driving unit may perform a calibration operation according to the received calibration operation signal. That is, the user may enter an input to immediately calibrate the motor driving unit or select a reservation time to perform calibration. The electronic device 500 may output a calibration operation signal to the motor driving unit according to the received input associated with the calibration.

When the user postpones the calibration, the electronic device 500 according to various embodiments may use the flexible display while allowing the error before calibration is performed, or may control the motor driving unit to reduce/expand the flexible display according to the cumulative average of detected error values as another embodiment.

The electronic device 500 according to various embodiments may, when it is determined in operation 740 that calibration is needed, output a calibration operation signal to the motor driving unit in operation 770. The motor driving unit according to an embodiment may perform a calibration operation, based on the received calibration operation signal.

The electronic device 500 according to various embodiments may, in operation 780, at a time of operation of the motor driving unit according to the calibration operation signal, output, to the flexible display, a second screen signal for turning off a screen displayed by the flexible display or displaying a pre-configured AOD screen.

Figure 11:
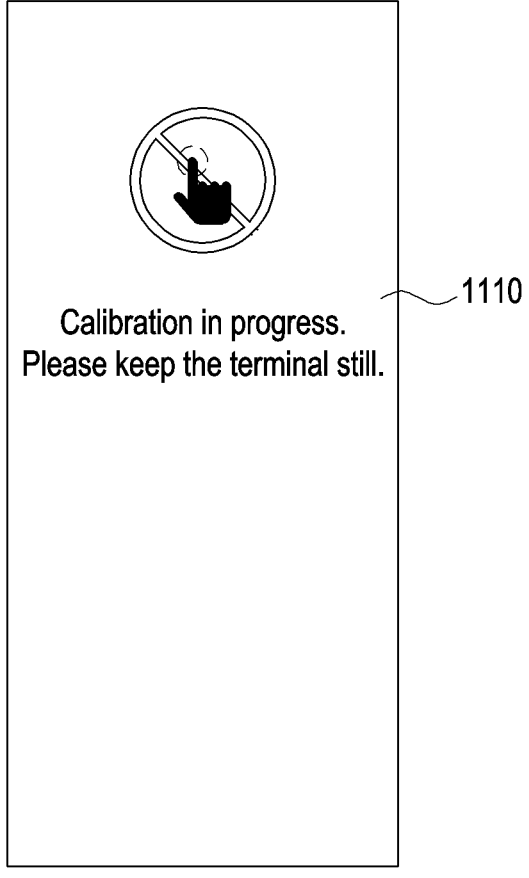
FIG. 11 illustrates an AOD screen of a flexible display while a motor driving unit is calibrated according to various embodiments.

FIG. 11 illustrates an AOD screen of a flexible display 1110 while a motor driving unit is calibrated according to various embodiments.

Further referring to FIG. 11, the electronic device 500 according to various embodiments may, at a time of operation of the motor driving unit according to a calibration operation signal, output, to the flexible display 1110, a second screen signal for turning off a screen displayed by the flexible display or displaying a pre-configured always on display (AOD) screen.

The electronic device 500 according to various embodiments may, when a calibration operation of the motor driving unit is performed, output the second screen signal to the flexible display and the flexible display may receive the second screen signal to turn off the displayed screen or display a pre-configured AOD screen. The pre-configured AOD screen may be a screen wherein power consumption is relatively reduced while the screen is displayed by the flexible display.

The electronic device 500 according to various embodiments may, when a calibration operation of the motor driving unit is performed, omit screen resizing in which a display screen in an area expanded or reduced according to an operation of the motor driving unit is turned on or turned off or a touch circuit is turned on or turned off.

The electronic device 500 according to various embodiments may perform calibration while changing only the physical size of the display without resizing the display screen and/or an application so as to reduce battery consumption, because there is no need to update the screen during the calibration operation. The electronic device may display that a calibration operation is being performed, to the user by using an AOD function in a state where the screen of the display is turned off, thereby guiding a touch input to be restricted. Only under these conditions, a proper correction is possible, and thus, the user needs to recognize that use of the electronic device 500 is restricted, through a UX during a calibration operation, and is induced to enter a reservation input for a particular time so as to enable a calibration operation at a time at which the use frequency of the electronic device 500 is very low, so that the user is not disturbed in using the electronic device.

As an embodiment, the calibration operation signal is a signal for the motor driving unit to move the second housing in each of the first direction and/or the second direction. As an embodiment, the motor driving unit may repeat movement of the second housing in the first direction and the second direction a pre-configured number of times, based on receiving the calibration operation signal. The calibration operation requires an operation in which the first housing and the second housing are expanded and then reduced by an operation of the motor driving unit. Therefore, such a calibration operation takes time, and is required to be performed when the following three conditions are satisfied to prevent interference in an operation in which the first housing and the second housing are expanded and then reduced while the flexible display is moved.

The electronic device needs to be not moved.

The electronic device has to be in a standby state where there is no user input.

The motor is required not to receive an interrupt signal.

The electronic device 500 according to various embodiments may, at the time of the operation of the motor driving unit according to the calibration operation signal, in case that, in operation 790, a touch input is received from the user, movement of the electronic device 500 is detected, or an interrupt signal is received from the motor driving unit, output a calibration stop signal for stopping the calibration operation to the motor driving unit in operation 792.

The electronic device 500 according to various embodiments may, at the time of the operation of the motor driving unit according to the calibration operation signal, in case that a touch input is received from the user, movement of the electronic device 500 is detected, or an interrupt signal is received from the motor driving unit, output a calibration stop signal for stopping the calibration operation to the motor driving unit. The motor driving unit according to an embodiment may stop the calibration operation when the calibration stop signal is received.

The electronic device 500 according to various embodiments may receive a touch input from the user via a touch circuit of the flexible display. In addition, the at least one processor may detect movement of the electronic device 500 via a GPS sensor, a motion sensor, and an acceleration sensor included in the electronic device 500. In addition, the processor may receive an interrupt signal from the motor driving unit, and for example, the motor driving unit may output an interrupt signal when the movement of the second housing with respect to the first housing is disturbed by a foreign material, or the movement of the second housing with respect to the first housing is blocked by an obstacle.

The electronic device 500 according to various embodiments may provide a visual notification or auditory notification to enabling the user to recognize stop of the calibration operation, after or simultaneously with outputting the calibration stop signal to the motor driving unit.

During calibration, only a corresponding operation is required to be performed without any interrupt so that the calibration using a correct value is possible. The electronic device 500 according to various embodiments may block, for a calibration operation, various events generated via the touch circuit to disable touch functionality, or when the phone is moved or a signal, such as an interrupt signal, is received to the motor during calibration, may stop the calibration and notify the user by using visual or auditory information.

The electronic device 500 according to various embodiments may, in operation 791, at a time of operation of the motor driving unit according to the calibration operation signal, update the pre-configured value and/or update the pre-configured reference value, based on the measurement value related to the movement by the motor driving unit. Specifically, the electronic device 500 including a distance sensor according to various embodiments may, at the time of the operation of the motor driving unit according to the calibration operation signal, update the pre-configured reference value, based on a measurement value of the distance sensor related to the movement by the motor driving unit.

The electronic device 500 according to various embodiments may update the pre-configured reference value while moving the second housing in each of the first direction and the second direction, at the time of the operation of the motor driving unit according to the calibration operation signal. Specifically, the motor driving unit may move the second housing up to a position at which further movement in the first direction is impossible, thereby moving the second housing to a first position at which the exposed area of the flexible display is minimum, and move the second housing up to a position at which further movement in the second direction is impossible, thereby moving the second housing to a second position at which the exposed area of the flexible display is maximum. The processor may update the pre-configured reference value, based on the distance by which the motor driving unit has moved the second housing between the first position and the second position. As another embodiment, as described below, the processor may update the pre-configured reference value, based on the distance detected by the distance sensor at a time of operation of the motor driving unit according to a control signal.

The electronic device 500 according to various embodiments may update the pre-configured reference value at a time of operation of the motor driving unit according to a calibration operation signal. The electronic device 500 may update a reference value for a movement time taken for the motor driving unit to move the second housing in the first direction or the second direction by a pre-configured value between the first position at which the exposed area of the flexible display is minimum and the second position at which the exposed area of the flexible display is maximum. The electronic device 500 may update a reference value for a relative position of the second housing or the flexible display at the first position at which the exposed area of the flexible display is minimum and the second position at which the exposed area of the flexible display is maximum.

The electronic device 500 according to various embodiments may update an existing pre-configured reference value table as the table below according to a new reference corresponding to the current state of the terminal, when a calibration operation is completed without interrupt during calibration.

TABLE 2

| Items | Before correction | After correction |
|---|---|---|
| Distance value (slide-in) from position (first position) at which display is minimum | 165 mm | 168 mm |
| Distance value (slide-out) from position (second position) at which display is maximum | 196 mm | 194 mm |
| Motor driving time (slide-in) | 1500 ms | 1600 ms |
| Motor driving time (slide-out) | 1300 ms | 1500 ms |

Figure 12:
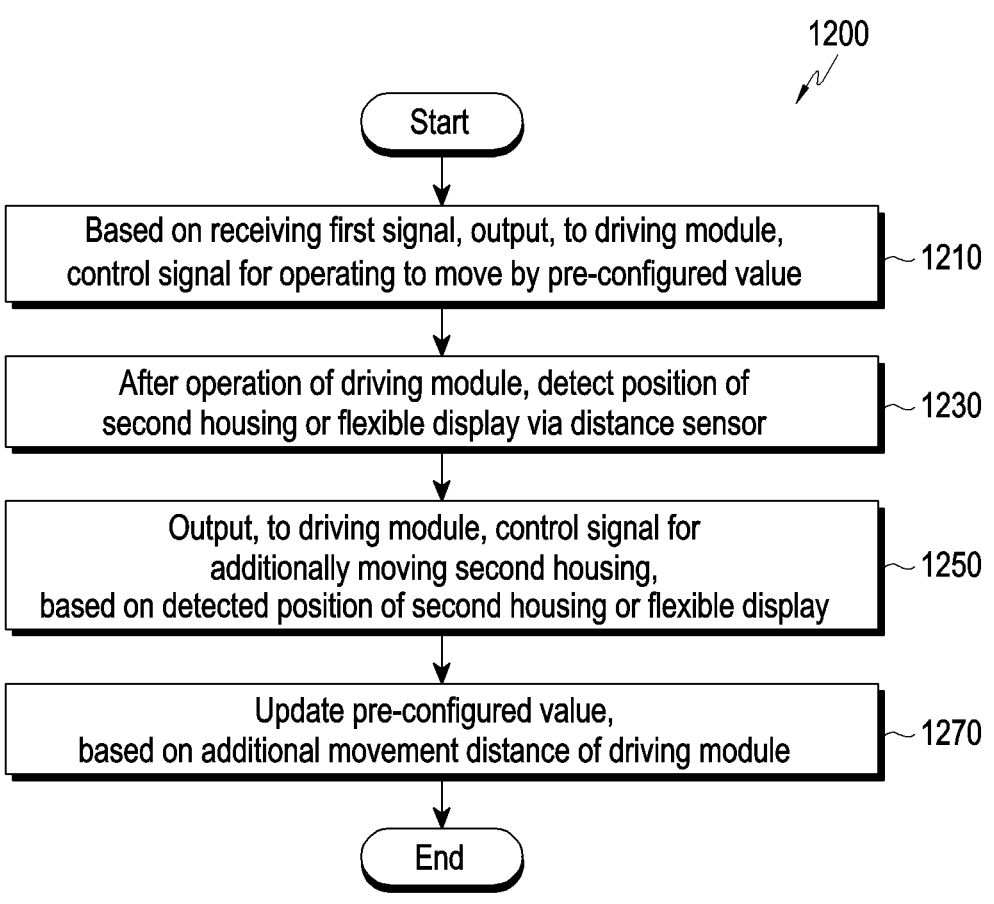
FIG. 12 illustrates a flowchart relating to an operation of operating a motor driving unit according to various embodiments.

FIG. 12 illustrates a flowchart 1200 relating to an operation of operating a motor driving unit according to various embodiments. Further referring to FIG. 12, an electronic device (e.g., the at least one processor 550) according to various embodiments may, in operation 1210, based on receiving a first signal, output, to a motor driving unit, a control signal for moving a second housing in a first direction or a second direction by a pre-configured value. The electronic device 500 according to various embodiment may, in operation 1230, output, to the distance sensor, a distance detection signal for detecting a relative position of the second housing or the flexible display before and after operation of the motor driving unit according to the control signal for moving by the pre-configuration value.

The electronic device 500 according to various embodiments may, in operation 1250, output, to the motor driving unit, a control signal for additionally moving the second housing in the first direction or the second direction, based on the relative position of the second housing or the flexible display detected by the distance sensor after the operation of the motor driving unit according to the control signal. The at least one processor may determine whether to output a control signal for additionally moving the second housing in the first direction or the second direction, based on the relative position of the second housing or the flexible display after the operation of the motor driving unit according to the control signal, or based on the distance between the relative positions of the second housing or the flexible display before and after the operation of the motor driving unit according to the control signal. For example, when the error between the position of the second housing or the flexible display detected by the distance sensor and the position of the second housing or the flexible display at the first position at which the exposed area of the flexible display is minimum or the second position at which same is maximum is equal to or greater than a pre-configured allowable error (e.g., 2 mm), or when the error between a pre-configured value and the distance between the relative positions of the second housing or the flexible display is equal to or greater than a pre-configured allowable error (e.g., 2 mm), the processor may output the control signal to the motor driving unit.

As an embodiment, the control signal may be a signal for moving the second housing by the error between a pre-configured value and a moved distance of the second housing based on the relative position of the second housing or the flexible display detected by the motor driving unit via the distance sensor. The processor may output the control signal to the motor driving unit a pre-configured distance (e.g., 1 mm) or smaller.

The electronic device 500 according to various embodiments may be configured to, in operation 1270, update the pre-configured value, based on an additional movement distance of the motor driving unit according to the control signal. The electronic device 500 according to various embodiments may update the pre-configured value operating the motor driving unit so that the additional movement distance of the motor driving unit is added thereto. Accordingly, in the future, an additional movement operation for the motor driving unit may be prevented by reflecting the error for operation of the motor driving unit on the pre-configuration value.

Figure 13:
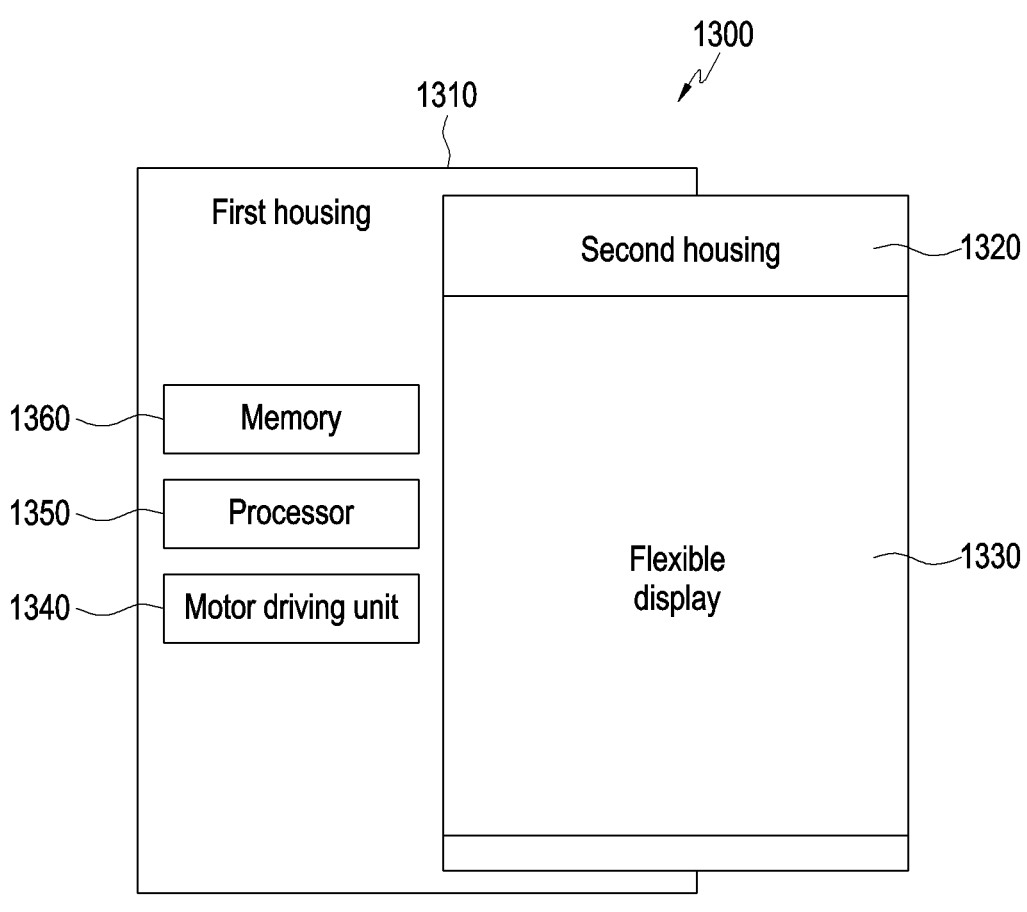
FIG. 13 illustrates a block diagram of an electronic device according to various embodiments.

FIG. 13 illustrates a block diagram of an electronic device 1300 according to various embodiments.

Further referring to FIG. 13, the electronic device 1300 including a flexible display 1330 according to various embodiments may not include a distance sensor.

Further referring to FIG. 12, the electronic device (e.g., the at least one processor 1350) according to various embodiments may, based on receiving a first signal, output, to a motor driving unit 1340, a control signal for moving a second housing 1320 with respect to a first housing 1310 in a first direction or a second direction by a pre-configured value. The motor driving unit 1340 may, based on receiving the control signal, operate a driving source to move the second housing 1320 with respect to the first housing 1310 in the first direction or the second direction by the pre-configured value.

The pre-configured value may be stored in a memory 1360 and configured in advance to be a distance by which movement by the motor driving unit 1340 is required to correspond to a movement distance for reduction and/or expansion of the flexible display 1330, based on an initial state of the motor driving unit 1340. At a time of operation of the motor driving unit 1340 according to a calibration operation signal, the motor driving unit 1340 may move the second housing 1320 with respect to the first housing 1310 until further movement in the first direction is impossible, whereby moving the second housing to a first position at which the exposed area of the flexible display 1330 is minimum, and move the second housing 1320 with respect to the first housing 1310 until further movement in the second direction is impossible, thereby moving the second housing to a second position at which the exposed area of the flexible display 1330 is maximum. The at least one processor 1350 may update the pre-configured value in the memory 1360, based on the distance by which the motor driving unit 1340 has moved the second housing 1320 between the first position and the second position.

As an embodiment, a measurement value related to behavior of the motor driving unit 1340 may include a movement time taken for the motor driving unit 1340 to move the second housing 1320 with respect to the first housing 1310 in the first direction or the second direction by the pre-configured value at the time of the operation of the motor driving unit 1340 according to the control signal. The electronic device 1300 according to various embodiments may determine whether calibration of the motor driving unit 1340 is needed, by comparing a pre-configured reference value with the movement time taken for the motor driving unit 1340 to move the second housing 1320 with respect to the first housing 1310 in the first direction or the second direction by the pre-configured value.

The flexible display 1330 may display a pre-configured moving screen, based on the pre-configured reference value for the movement time taken for the motor driving unit 1340 to move the second housing 1320 with respect to the first housing 1310 in the first direction or the second direction by the pre-configured value at a time of operation of the motor driving unit 1340 according to an operation signal.

The electronic device 1300 according to various embodiments may update a reference value for a movement time taken for the motor driving unit 1340 to move the second housing 1320 with respect to the first housing 1310 in the first direction or the second direction by a pre-configured value, at the time of the operation of the motor driving unit 1340 according to a calibration operation signal.

For example, the electronic device 1300 may update a pre-configured value, based on the distance by which the motor driving unit 1340 has moved the second housing 1320 between the first position and the second position, and then update a reference value for a movement time taken for the motor driving unit 1340 to move the second housing 1320 in the first direction or the second direction by the updated pre-configured value.

Figure 14:
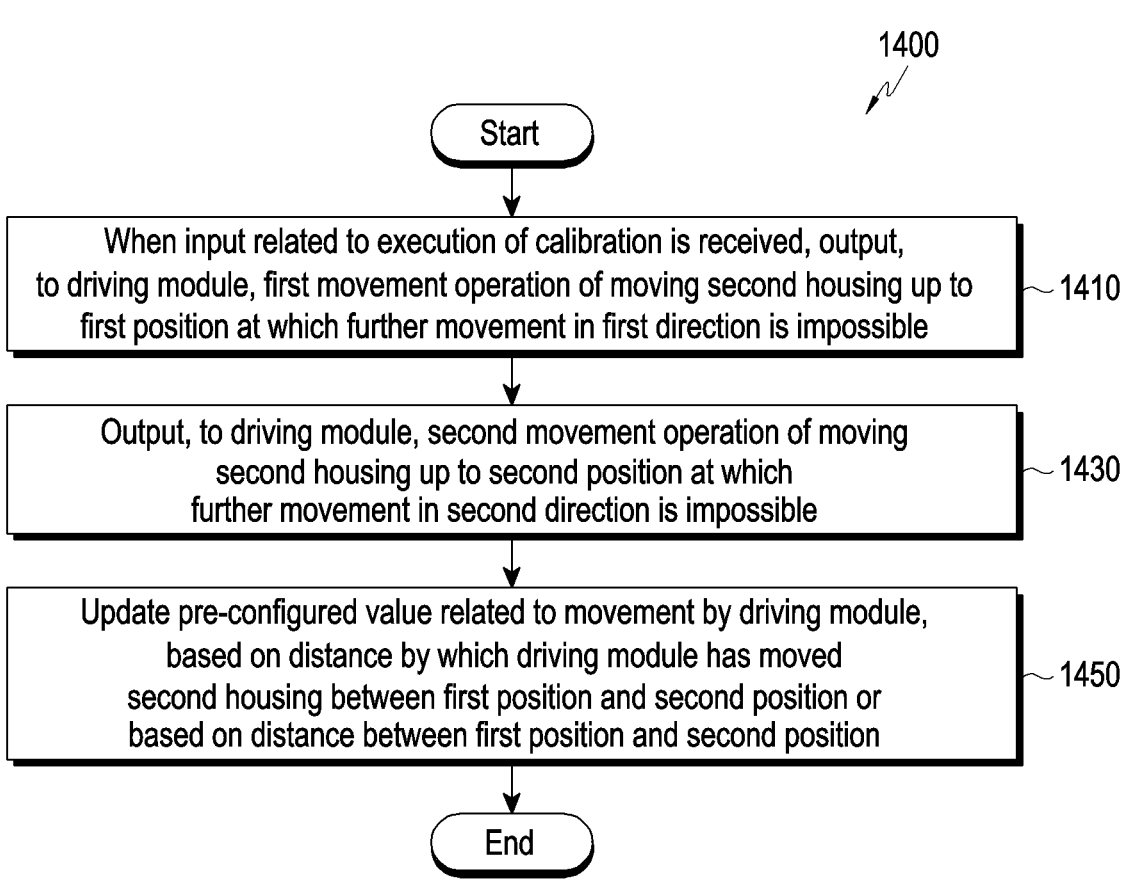
FIG. 14 illustrates a flowchart relating to a calibration operation of an electronic device according to various embodiments.

FIG. 14 illustrates a flowchart 1400 relating to a calibration operation of an electronic device according to various embodiments.

Referring to FIG. 14, an electronic device according to various embodiments may, in operation 1410, when an input related to execution of calibration is received, output, to a motor driving unit, a first movement operation of moving a second housing, which is disposed to be movable with respect to a first housing, up to a first position at which further movement in a first direction is impossible.

The electronic device according to various embodiments may, in operation 1430, output, to the motor driving unit, a second movement operation of moving the second housing up to a second position at which further movement in a second direction is impossible.

The electronic device according to various embodiments may, in operation 1450, update a pre-configured value (e.g., a pre-configured value by which the motor driving unit moves the second housing in the first direction or the second direction) related to movement by the motor driving unit, based on the distance by which the motor driving unit has moved the second housing between the first position and the second position or based on the distance (e.g., measured via a distance sensor) between the first position and the second position.

An electronic device according to an embodiment may include a first housing, a second housing disposed to be movable with respect to the first housing, a flexible display configured to be at least partially mounted on the second housing and inserted into the first housing, based on movement of the second housing in a first direction, or ejected from inside the first housing, based on movement of the second housing in a second direction, a motor driving unit configured to move the second housing in the first direction or the second direction, memory storing executable instructions, and at least one processor configured to access the memory to execute the instructions. The instructions, when executed by the at least one processor individually or collectively, cause the electronic device to, based on receiving a first signal, output, to the motor driving unit, a control signal for moving the second housing in the first direction or the second direction by a pre-configured value. The instructions, when executed by the at least one processor individually or collectively, cause the electronic device to, at a time of operation of the motor driving unit according to the control signal, compare a measurement value related to movement by the motor driving unit with a pre-configured reference value. The instructions, when executed by the at least one processor individually or collectively, cause the electronic device to, based on a result of the comparison, determine whether calibration of the motor driving unit is needed. The instructions, when executed by the at least one processor individually or collectively, cause the electronic device to, based on the determination that the calibration is needed, provide a user with a notification related to the calibration being needed.

In the electronic device according to an embodiment, the instructions, when executed by the at least one processor individually or collectively, cause the electronic device to, in case that an input related to execution of the calibration is received, output a calibration operation signal to the motor driving unit.

In the electronic device according to an embodiment, the measurement value related to the movement by the motor driving unit may include a rotation count of a motor included in the motor driving unit or a driving time of the motor.

In the electronic device according to an embodiment, the instructions, when executed by the at least one processor individually or collectively, cause the electronic device to, at the time of the operation of the motor driving unit according to the control signal, based on the pre-configured reference value, output, to the flexible display, a first screen signal for resizing a screen displayed by the flexible display or displaying a pre-configured moving screen.

In the electronic device according to an embodiment, the calibration operation signal may be a signal for the motor driving unit to move the second housing in each of the first direction and the second direction. The instructions, when executed by the at least one processor individually or collectively, cause the electronic device to, at a time of operation of the motor driving unit according to the calibration operation signal, update the pre-configured value or update the pre-configured reference value, based on a measurement value related to movement by the motor driving unit.

In the electronic device according to an embodiment, the instructions, when executed by the at least one processor individually or collectively, cause the electronic device to, at a time of operation of the motor driving unit according to the calibration operation signal, output, to the flexible display, a second screen signal for turning off a screen displayed by the flexible display or displaying a pre-configured AOD screen.

In the electronic device according to an embodiment, the instructions, when executed by the at least one processor individually or collectively, cause the electronic device to, at a time of operation of the motor driving unit according to the calibration operation signal, in case that a touch input is received from a user, movement of the electronic device is detected, or an interrupt signal is received from the motor driving unit, output a calibration stop signal for stopping a calibration operation to the motor driving unit.

The electronic device according to an embodiment may further include a distance sensor that is fixed to the first housing and is configured to detect a relative position of the second housing or the flexible display, wherein the measurement value related to the movement of the motor driving unit includes the relative position of the second housing or the flexible display at the time of the operation of the motor driving unit according to the control signal.

In the electronic device according to an embodiment, the instructions, when executed by the at least one processor individually or collectively, cause the electronic device to, after the operation of the motor driving unit according to the control signal, based on the relative position of the second housing or the flexible display detected by the distance sensor, output, to the motor driving unit, an additional control signal for additionally moving the second housing in the first direction or the second direction.

In the electronic device according to an embodiment, the at least one processor may be configured to, based on an additional movement distance of the motor driving unit according to the additional control signal, update the pre-configured value.

In the electronic device according to an embodiment, the electronic device may also include a distance sensor configured to detect a position of the second housing relative to the first housing, where the at least one processor is further configured to determine an actual movement distance of the second housing based on signals from the distance sensor before and after the movement of the second housing and compare the actual movement distance to an expected movement distance corresponding to the pre-configured value to determine whether calibration is needed.

In the electronic device according to an embodiment, the at least one processor is further configured to calculate a difference between the actual movement distance and the expected movement distance and determine that calibration is needed if the difference exceeds a predetermined threshold.

An operation method of an electronic device according to an embodiment of the disclosure may include, based on receiving a first signal, outputting, to a motor driving unit, a control signal for moving a second housing, which is disposed to be movable with respect to a first housing, in a first direction or a second direction by a pre-configured value. The operation method of the electronic device may include, at a time of operation of the motor driving unit according to the control signal, comparing a measurement value related to movement by the motor driving unit with a pre-configured reference value. The operation method of the electronic device may include, based on a result of the comparison, determining whether calibration of the motor driving unit is needed. The operation method of the electronic device may include, based on the determination that the calibration is needed, providing a user with a notification related to the calibration being needed.

The operation method of the electronic device according to an embodiment may further include, in case that an input related to execution of the calibration is received, outputting a calibration operation signal to the motor driving unit.

In the operation method of the electronic device according to various embodiments, the measurement value related to the movement by the motor driving unit may include a rotation count of a motor included in the motor driving unit or a driving time of the motor.

The operation method of the electronic device according to an embodiment may further include, at the time of the operation of the motor driving unit according to the control signal, based on the pre-configured reference value, outputting, to a flexible display, a first screen signal for resizing a screen displayed by a flexible display or displaying a pre-configured moving screen, the flexible display being inserted into the first housing, based on movement of the second housing in the first direction or being ejected from inside the first housing, based on movement of the second housing in the second direction.

In the operation method of the electronic device according to an embodiment, the calibration operation signal may be a signal for the motor driving unit to move the second housing in each of the first direction and the second direction. The operation method of the electronic device according to various embodiments may further include, at a time of operation of the motor driving unit according to the calibration operation signal, updating the pre-configured value or updating the pre-configured reference value, based on the measurement value related to the movement by the motor driving unit.

The operation method of the electronic device according to an embodiment may further include, at a time of operation of the motor driving unit according to the calibration operation signal, in case that a touch input is received from a user, movement of the electronic device is detected, or an interrupt signal is received from the motor driving unit, outputting a calibration stop signal for stopping a calibration operation to the motor driving unit.

In the operation method of the electronic device according to an embodiment, the measurement value related to the movement by the motor driving unit may include a relative position of the second housing or the flexible display detected by a distance sensor fixed to the first housing, at the time of the operation of the motor driving unit according to the control signal.

The operation method of the electronic device according to an embodiment may further include, after the outputting of the control signal to the motor driving unit, based on the relative position of the second housing or the flexible display detected by the distance sensor, outputting, to the motor driving unit, an additional control signal for additionally moving the second housing in the first direction or the second direction.

The operation method of the electronic device according to an embodiment may further include, after the outputting of the additional control signal to the motor driving unit, based on an additional movement distance of the motor driving unit according to the additional control signal, updating the pre-configured value.

An operation method of an electronic device according to an embodiment of the disclosure may include, in case that an input related to execution of calibration is received, outputting, to a motor driving unit, a first movement operation of moving a second housing, which is disposed to be movable with respect to a first housing, up to a first position at which further movement in a first direction is impossible. The operation method of the electronic device may include outputting, to the motor driving unit, a second movement operation of moving the second housing up to a second position at which further movement in a second direction is impossible. The operation method of the electronic device may include updating a pre-configured value related to movement by the motor driving unit, based on a distance by which the motor driving unit has moved the second housing between the first position and the second position or based on a distance between the first position and the second position.

The invention claimed is:

1. An electronic device comprising: a first housing; a second housing disposed to be movable with respect to the first housing; a flexible display configured to be at least partially mounted on the second housing and inserted into the first housing, based on movement of the second housing in a first direction, or ejected from inside the first housing, based on movement of the second housing in a second direction; a motor driving unit configured to move the second housing in the first direction or the second direction; memory storing executable instructions; and at least one processor configured to access the memory to execute the instructions, wherein the instructions, when executed by the at least one processor individually or collectively, cause the electronic device to: based on receiving a first signal, output, to the motor driving unit, a control signal for moving the second housing in the first direction or the second direction by a pre-configured value; at a time of operation of the motor driving unit according to the control signal, compare a measurement value related to movement by the motor driving unit with a pre-configured reference value; based on a result of the comparison, determine whether calibration of the motor driving unit is needed; and based on the determination that the calibration is needed, provide a user with a notification related to the calibration being needed.

2. The electronic device of claim 1, wherein the instructions, when executed by the at least one processor individually or collectively, cause the electronic device to, in case that an input related to execution of the calibration is received, output a calibration operation signal to the motor driving unit.

3. The electronic device of claim 2, wherein the calibration operation signal is a signal for the motor driving unit to move the second housing in each of the first direction and the second direction, and wherein the instructions, when executed by the at least one processor individually or collectively, cause the electronic device to, at a time of operation of the motor driving unit according to the calibration operation signal, update the pre-configured value or update the pre-configured reference value, based on the measurement value related to the movement by the motor driving unit.

4. The electronic device of claim 3, wherein the instructions, when executed by the at least one processor individually or collectively, cause the electronic device to, at the time of operation of the motor driving unit according to the calibration operation signal, output, to the flexible display, a second screen signal for turning off a screen displayed by the flexible display or displaying a pre-configured AOD screen.

5. The electronic device of claim 2, wherein the instructions, when executed by the at least one processor individually or collectively, cause the electronic device to, at the time of operation of the motor driving unit according to the calibration operation signal, in case that a touch input is received from a user, movement of the electronic device is detected, or an interrupt signal is received from the motor driving unit, output a calibration stop signal for stopping a calibration operation to the motor driving unit.

6. The electronic device of claim 1, wherein the measurement value related to the movement by the motor driving unit comprises a rotation count of a motor included in the motor driving unit or a driving time of the motor.

7. The electronic device of claim 1, wherein the instructions, when executed by the at least one processor individually or collectively, cause the electronic device to, at the time of the operation of the motor driving unit according to the control signal, based on the pre-configured reference value, output, to the flexible display, a first screen signal for resizing a screen displayed by the flexible display or displaying a pre-configured moving screen.

8. The electronic device of claim 1, further comprising a distance sensor that is fixed to the first housing and is configured to detect a relative position of the second housing or the flexible display, wherein the measurement value related to the movement by the motor driving unit comprises the relative position of the second housing or the flexible display at the time of the operation of the motor driving unit according to the control signal.

9. The electronic device of claim 8, wherein the instructions, when executed by the at least one processor individually or collectively, cause the electronic device to, after the operation of the motor driving unit according to the control signal, based on the relative position of the second housing or the flexible display detected by the distance sensor, output, to the motor driving unit, a control signal for additionally moving the second housing in the first direction or the second direction.

10. The electronic device of claim 9, wherein instructions, when executed by the at least one processor individually or collectively, cause the electronic device to, based on an additional movement distance of the motor driving unit according to the control signal, update the pre-configured value.

11. The electronic device of claim 1, further comprising: a distance sensor configured to detect a position of the second housing relative to the first housing, wherein the at least one processor is further configured to: determine an actual movement distance of the second housing based on signals from the distance sensor before and after the movement of the second housing; and compare the actual movement distance to an expected movement distance corresponding to the pre-configured value to determine whether calibration is needed.

12. The electronic device of claim 11, wherein the at least one processor is further configured to: calculate a difference between the actual movement distance and the expected movement distance; and determine that calibration is needed if the difference exceeds a predetermined threshold.

13. An operation method of an electronic device, the method comprising: based on receiving a first signal, outputting, to a motor driving unit, a control signal for moving a second housing, which is disposed to be movable with respect to a first housing, in a first direction or a second direction by a pre-configured value; at a time of operation of the motor driving unit according to the control signal, comparing a measurement value related to movement by the motor driving unit with a pre-configured reference value; based on a result of the comparison, determining whether calibration of the motor driving unit is needed; and based on the determination that the calibration is needed, providing a user with a notification related to the calibration being needed.

14. The method of claim 13, further comprising, in case that an input related to execution of the calibration is received, outputting a calibration operation signal to the motor driving unit.

15. The method of claim 14, wherein the calibration operation signal is a signal for the motor driving unit to move the second housing in each of the first direction and the second direction, and the method further comprises, at the time of operation of the motor driving unit according to the calibration operation signal, updating the pre-configured value or updating the pre-configured reference value, based on the measurement value related to the movement by the motor driving unit.

16. The method of claim 14, further comprising, at the time of operation of the motor driving unit according to the calibration operation signal, in case that a touch input is received from a user, movement of the electronic device is detected, or an interrupt signal is received from the motor driving unit, outputting a calibration stop signal for stopping a calibration operation to the motor driving unit.

17. The method of claim 13, wherein the measurement value related to the movement by the motor driving unit comprises a relative position of the second housing detected by a distance sensor fixed to the first housing, at the time of the operation of the motor driving unit according to the control signal.

18. An electronic device comprising: a first housing; a second housing disposed to be movable with respect to the first housing; a flexible display that is at least partially mounted on the second housing and is inserted into the first housing, based on movement of the second housing in a first direction, or is ejected from inside the first housing, based on movement of the second housing in a second direction; a motor driving unit configured to move the second housing in the first direction or the second direction; memory configured to store executable instructions; and at least one processor configured to access the memory to execute the instructions, wherein the at least one processor is configured to: based on receiving a first signal, output, to the motor driving unit, a control signal for moving the second housing in the first direction or the second direction by a pre-configured value; at a time of operation of the motor driving unit according to the control signal, compare a measurement value related to movement by the motor driving unit with a pre-configured reference value; based on a result of the comparison, determine whether calibration of the motor driving unit is needed; and in case that a result of the determination indicates that the calibration is needed, provide a user with a notification related to the calibration being needed, wherein the at least one processor is further configured to, in case that an input related to execution of the calibration is received, output a calibration operation signal to the motor driving unit, and wherein the calibration operation signal is a signal for the motor driving unit to move the second housing in each of the first direction and the second direction, and wherein the at least one processor is configured to, at a time of operation of the motor driving unit according to the calibration operation signal, update the pre-configured value or update the pre-configured reference value, based on the measurement value related to the movement by the motor driving unit.

* * * * *